United States Patent
Honda et al.

(10) Patent No.: US 9,857,115 B2
(45) Date of Patent: Jan. 2, 2018

(54) AIR-CONDITIONING APPARATUS

(75) Inventors: Takayoshi Honda, Tokyo (JP); Osamu Morimoto, Tokyo (JP); Daisuke Shimamoto, Tokyo (JP); Koji Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 511 days.

(21) Appl. No.: 14/390,430

(22) PCT Filed: May 14, 2012

(86) PCT No.: PCT/JP2012/003124
§ 371 (c)(1),
(2), (4) Date: Oct. 3, 2014

(87) PCT Pub. No.: WO2013/171781
PCT Pub. Date: Nov. 21, 2013

(65) Prior Publication Data
US 2015/0047379 A1  Feb. 19, 2015

(51) Int. Cl.
*F25B 49/02* (2006.01)
*F25D 17/04* (2006.01)
(Continued)

(52) U.S. Cl.
CPC .............. *F25B 49/02* (2013.01); *F25B 13/00* (2013.01); *F25B 25/005* (2013.01); *F25D 17/02* (2013.01);
(Continued)

(58) Field of Classification Search
CPC ........ F25B 13/00; F25B 25/005; F25B 49/02; F25B 2313/006; F25B 2313/0231;
(Continued)

(56) References Cited

U.S. PATENT DOCUMENTS 5,369,964 A * 12/1994 Mauer ................... F24F 3/1405
165/104.17
5,462,085 A * 10/1995 Iwata .................... F16K 11/074
137/614.21
(Continued)

FOREIGN PATENT DOCUMENTS

CN  102365502 A  2/2012
JP  2000-088296 A  3/2000
(Continued)

OTHER PUBLICATIONS

Extended European Search Report dated Apr. 18, 2016 issued in the corresponding EP patent application No. 12876971.8-1602.
(Continued)

*Primary Examiner* — Mohammad M Ali
(74) *Attorney, Agent, or Firm* — Posz Law Group, PLC

(57) ABSTRACT

An air-conditioning apparatus is provided to which, even when a heat medium leaks from a heat medium circuit for some reason and air enters the heat medium circuit, the heat medium circuit can be automatically refilled with the heat medium before a pump is heated and damaged. When it is determined that a rotational speed of a pump is higher than an upper rotational speed limit, the controller determines that the heat medium is leaking from the heat medium circuit and performs a heat-medium-introducing and air-purging control process.

14 Claims, 10 Drawing Sheets

(51) Int. Cl.
*F25B 13/00* (2006.01)
*F25B 25/00* (2006.01)
*F25D 17/02* (2006.01)
*F24F 11/00* (2006.01)

(52) U.S. Cl.
CPC ...... *F25D 17/04* (2013.01); *F24F 2011/0084* (2013.01); *F25B 2313/006* (2013.01); *F25B 2313/0231* (2013.01); *F25B 2313/0233* (2013.01); *F25B 2313/02741* (2013.01); *F25B 2313/02791* (2013.01); *F25B 2600/13* (2013.01); *Y02B 30/745* (2013.01)

(58) Field of Classification Search
CPC .... F25B 2313/0233; F25B 2313/02741; F25B 2600/13; F25B 2313/02791; F25D 17/02; F25D 17/04; Y02B 30/745
USPC .......................................... 62/125, 177, 401
See application file for complete search history.

(56) References Cited

U.S. PATENT DOCUMENTS

| | | | | |
|---|---|---|---|---|
| 5,681,218 | A * | 10/1997 | Kishi | B60H 3/0085 454/139 |
| 6,134,899 | A * | 10/2000 | Brown | B60H 1/00585 62/126 |
| 2009/0013687 | A1 * | 1/2009 | Swenson | F02D 23/00 60/600 |
| 2011/0192184 | A1 * | 8/2011 | Yamashita | F24F 1/02 62/196.1 |
| 2011/0203675 | A1 * | 8/2011 | Rahhali | B60H 1/00585 137/15.04 |
| 2011/0302941 | A1 | 12/2011 | Takata | |

FOREIGN PATENT DOCUMENTS

| | | |
|---|---|---|
| JP | 2003-130482 A | 5/2003 |
| JP | 2003-343936 A | 12/2003 |
| JP | 2010-048447 A | 3/2010 |
| WO | 2010/049998 A1 | 5/2010 |

OTHER PUBLICATIONS

Office Action dated Aug. 1, 2016 issued in corresponding CN patent application No. 201280073883.8 (and English translation).
Office Action dated Aug. 25, 2015 issued in corresponding JP patent application No. 2014-515345 (and English translation).
International Search Report of the International Searching Authority dated Aug. 14, 2012 for the corresponding international application No. PCT/JP2012/003124 (and English translation).

* cited by examiner

AIR-CONDITIONING APPARATUS

CROSS REFERENCE TO RELATED APPLICATIONS

This application is a U.S. national stage application of PCT/JP2012/003124 filed on May 14, 2012, the contents of which are incorporated herein by reference.

TECHNICAL FIELD

The present invention relates to an air-conditioning apparatus for use in, for example, a multi-air-conditioning system for a building.

BACKGROUND

An example of an existing multi-air-conditioning system for a building includes an air-conditioning apparatus including an outdoor unit, which is a heat source unit disposed outdoors, and an indoor unit disposed indoors. The air-conditioning apparatus performs a cooling operation or a heating operation by circulating a refrigerant between the outdoor unit and the indoor unit and conveying cooling energy or heating energy to an air-conditioned space, such as the inside of a room. In such an air-conditioning apparatus, HFC refrigerants, for example, are widely used as the refrigerant. Also, natural refrigerants, such as carbon dioxide, have been used in recent years.

A chiller system is a typical example of an existing air-conditioning apparatus having another configuration. In this air-conditioning apparatus, a cooling operation or a heating operation is performed by generating cooling energy or heating energy in a heat source unit disposed outdoors, transferring the cooling energy or heating energy to a heat medium, such as water or antifreezing fluid, in a heat exchanger arranged in the outdoor unit, and conveying the heat medium to a fan coil unit, a panel heater, or the like, which is an indoor unit arranged in an air-conditioned space, through a heat medium circuit (see, for example, Patent Literature 1).

With the air-conditioning apparatus described in Patent Literature 1, there has been a risk that a user will be adversely affected if the refrigerant leaks into the room. Therefore, as an example of an air-conditioning apparatus according to the related art in which the refrigerant is circulated through the indoor unit, an air-conditioning apparatus capable of detecting a leakage of the refrigerant into the room (from a use-side heat exchanger or a pipe disposed near the use-side heat exchanger) has been proposed. For example, an apparatus has been proposed which includes "a single heat source unit A including a compressor 1, a four-way switching valve 2 that switches a passage of a refrigerant discharged from the compressor, and a heat-source-unit-side heat exchanger 3; a plurality of indoor units B, C, and D, each of which includes an indoor-side heat exchanger 5 and a flow-rate control device 9; and a relay unit including a first branch portion 10, valve devices 20, and a second branch portion 11, the first branch portion 10 connecting the heat source unit to the indoor units with first and second connection pipes 6 and 7 and including valve devices 8a and 8b that connect one end of each indoor-side heat exchanger to one of the first and second connection pipes in a switchable manner, each valve device 20 being connected to the other end of the corresponding indoor-side heat exchanger, and the second branch portion 11 being capable of connecting the other end of each indoor-side heat exchanger to the second connection pipe through check valves 17 and 18 connected to the corresponding valve device" (see, for example, Patent Literature 2).

However, the air-conditioning apparatus described in Patent Literature 2 has a problem in that detection of a leakage of the heat medium from the heat medium circuit arranged near the room is not particularly taken into consideration because, for example, the heat medium does not have a large adverse effect on the user. Accordingly, an air-conditioning apparatus has been proposed in which, with regard to a leakage of heat medium (such as water), it is determined that air that has entered in a pipe is discharged when a pump driving current changes from a value lower than or equal to a predetermined reference current value to a value above the predetermined reference current value (see, for example, Patent Literature 3).

PATENT LITERATURE

Patent Literature 1: Japanese Unexamined Patent Application Publication No. 2003-343936 (page 5, FIG. 1)

Patent Literature 2: Japanese Unexamined Patent Application Publication No. 2003-130482 (Abstract, FIG. 1)

Patent Literature 3: Japanese Unexamined Patent Application Publication No. 2010-48447 (pages 8-9, FIG. 4)

However, the air-conditioning apparatus described in Patent Literature 3 includes an engine that drives a compressor included in a refrigerant circuit, and a cooling water circuit that circulates cooling water through the engine. Therefore, in an air-conditioning apparatus including a pump for driving a motor with an inverter or an air-conditioning apparatus in which circulating water is used as the heat medium, there is no method for detecting an entrance of air into the circuit and protecting the pump.

SUMMARY

The present invention has been made to solve the above-described problems, and an object of the present invention is to provide an air-conditioning apparatus in which, even when a heat medium leaks from a heat medium circuit for some reason and air enters the heat medium circuit, the heat medium circuit can be automatically refilled with the heat medium before a pump is heated and damaged.

An air-conditioning apparatus according to the present invention includes a heat source device including a compressor that compresses a heat-source-side refrigerant and a heat-source-side heat exchanger that exchanges heat between outside air and the heat-source-side refrigerant; a relay unit including an intermediate heat exchanger that exchanges heat between the heat-source-side refrigerant and a heat medium, an expansion device that reduces a pressure of the heat-source-side refrigerant, and a pump that pressure-feeds the heat medium; an indoor unit including a use-side heat exchanger that exchanges heat between air in an air-conditioned space and the heat medium; and a controller that controls at least the heat source device and the relay unit. A refrigeration cycle through which the heat-source-side refrigerant circulates is formed by connecting the compressor, the heat-source-side heat exchanger, a heat-source-side refrigerant passage of the intermediate heat exchanger, and the expansion device with a refrigerant pipe. A heat medium circuit through which the heat medium circulates is formed by connecting a heat medium passage of the intermediate heat exchanger, the pump, and the use-side heat exchanger with a pipe. While driving the pump, the controller detects a rotational speed of the pump and, on a basis of the rotational speed, starts a heat-medium introducing operation in which the heat medium is introduced into the heat medium circuit, and an air purging operation in which air that has entered the heat medium circuit is discharged.

According to the present invention, even when the heat medium leaks from the heat medium circuit for some reason and air enters the heat medium circuit, the leakage of the heat medium can be detected by determining the pump rotational speed. By detecting the leakage of the heat medium, the operation of introducing the heat medium into the heat medium circuit can be performed and damage to the pumps, which occurs when cooling with the heat medium cannot be performed due to insufficiency of the heat medium, can be reduced and the reliability can be increased.

DETAILED DESCRIPTION

Embodiment 1

Installation State of Air-Conditioning Apparatus

Figure 1:
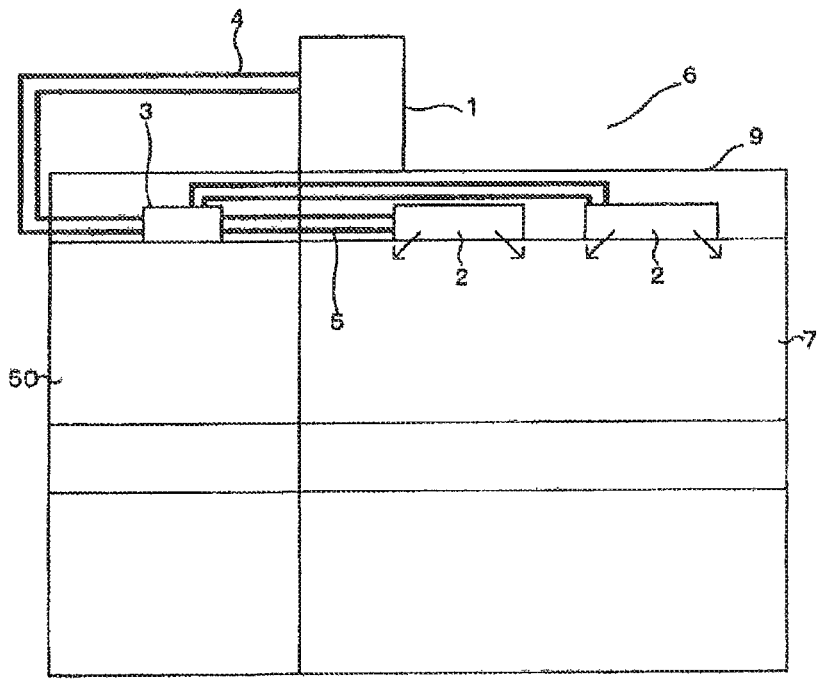
FIG. 1 is a diagram illustrating an example of an installation state of an air-conditioning apparatus according to Embodiment 1 of the present invention.
Figure 2:
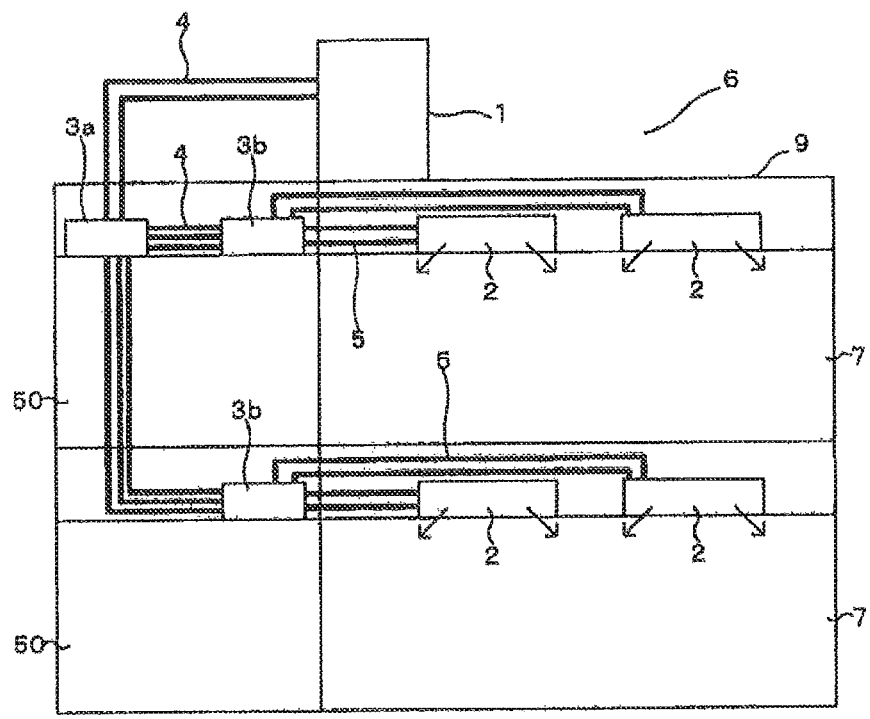
FIG. 2 is a diagram illustrating another example of an installation state of the air-conditioning apparatus according to Embodiment 1 of the present invention.

FIG. 1 is a diagram illustrating an example of an installation state of an air-conditioning apparatus according to Embodiment 1 of the present invention. FIG. 2 is a diagram illustrating another example of an installation state of the air-conditioning apparatus. The structure of the air-conditioning apparatus will be described with reference to FIGS. 1 and 2.

The air-conditioning apparatus according to Embodiment 1 performs a cooling operation or a heating operation by using a refrigeration cycle system (a refrigeration cycle and a heat medium circuit) for circulating refrigerants (a heat-source-side refrigerant and a heat medium (water, antifreezing fluid, or the like)).

In FIG. 1 and other figures described below, the relationships between the sizes of components may differ from the actual relationships.

As illustrated in FIG. 1, the air-conditioning apparatus according to Embodiment 1 includes a single heat source device 1, which is a heat source unit, a plurality of indoor units 2, and a relay unit 3 located between the heat source device 1 and the indoor units 2. The relay unit 3 exchanges heat between the heat-source-side refrigerant and the heat medium. The heat source device 1 is connected to the relay unit 3 with refrigerant pipes 4 through which the heat-source-side refrigerant is guided, and the relay unit 3 is connected to the indoor units 2 with pipes 5 through which the heat medium is guided. Thus, cooling energy or heating energy generated by the heat source device 1 can be delivered to the indoor units 2.

The numbers of heat source devices 1, indoor units 2, and relay units 3 connected to one another are not limited to those illustrated in FIG. 1.

The heat source device 1 is usually arranged in an outdoor space 6, which is a space outside a building 9, such as a tower building, and supplies the cooling energy or heating energy to the indoor units 2 through the relay unit 3. The indoor units 2 are arranged in a living space 7, such as a living room or a server room, in the building 9 to which air for cooling or heating can be conveyed, and supply the air for cooling or heating to the living space 7, which is a space to be air-conditioned. The relay unit 3 is formed separately from the heat source device 1 and the indoor unit 2 so that the relay unit 3 can be installed in a space different from the outdoor space 6 and the living space 7 (hereinafter referred to as a non-living space 50). The relay unit 3 connects the heat source device 1 to the indoor units 2, and transfers the cooling energy or heating energy supplied from the heat source device 1 to the indoor units 2.

The outdoor space 6 is assumed to be a space outside the building 9, such as a rooftop, as shown in FIG. 1.

The non-living space 50 is assumed to be a space that is inside the building 9 but is different from the living space 7, and may be, for example, a space into which people do not stay, such as a space above a corridor, a space above a ceiling of a common zone, a common space where an elevator or the like is installed, a machine room, a computer room, or a storage.

The living space 7 is assumed to be a space inside the building 9 where people are always present or where a large or small number of people are at least temporarily present, such as an office, a classroom, a meeting room, a dining room, or a server room.

The heat source device 1 and the relay unit 3 are connected to each other with two refrigerant pipes 4. The relay unit 3 and each indoor unit 2 are connected to each other with two pipes 5. Thus, the air-conditioning apparatus can be constructed with ease by connecting the heat source device 1 to the relay unit 3 with the two refrigerant pipes 4 and connecting each indoor unit 2 to the relay unit 3 with the two pipes 5.

As illustrated in FIG. 2, the relay unit 3 may be configured so as to include one first relay unit 3a and two second relay units 3b branching from the first relay unit 3a. With this configuration, a plurality of second relay units 3b can be connected to a single first relay unit 3a. In this configuration, three refrigerant pipes 4 are provided between the first relay unit 3a and each second relay unit 3b. Details of this pipe structure will be described below.

In the example illustrated in FIGS. 1 and 2, the indoor units 2 are of a ceiling cassette type. However, the indoor units 2 are not limited to this, and may be of any type, such as a ceiling-concealed type or a ceiling-suspended type, as long as cooling energy or heating energy can be blown into the living space 7 directly or through a duct.

Also, although the heat source device 1 is installed in the outdoor space 6 in the example illustrated in FIGS. 1 and 2, the arrangement of the heat source device 1 is not limited to this. For example, the heat source device 1 may instead be installed in a closed-off space, such as a machine room with an exhaust fan. The heat source device 1 may be installed in a space inside the building 9 as long as waste heat can be exhausted from the space to the outside of the building 9 through an exhaust air duct, and may be installed inside the building 9 when the heat source device 1 is of a water-cooled type. Even when the heat source device 1 is installed in these spaces, no particular problem occurs.

Although the relay unit 3 may be installed in the vicinity of the heat source device 1, it is to be noted that if the distance from the relay unit 3 to each indoor unit 2 is too large, energy saving effect will be reduced since large power is required to convey the heat medium.

(Structure of Air-Conditioning Apparatus)

Figure 3:
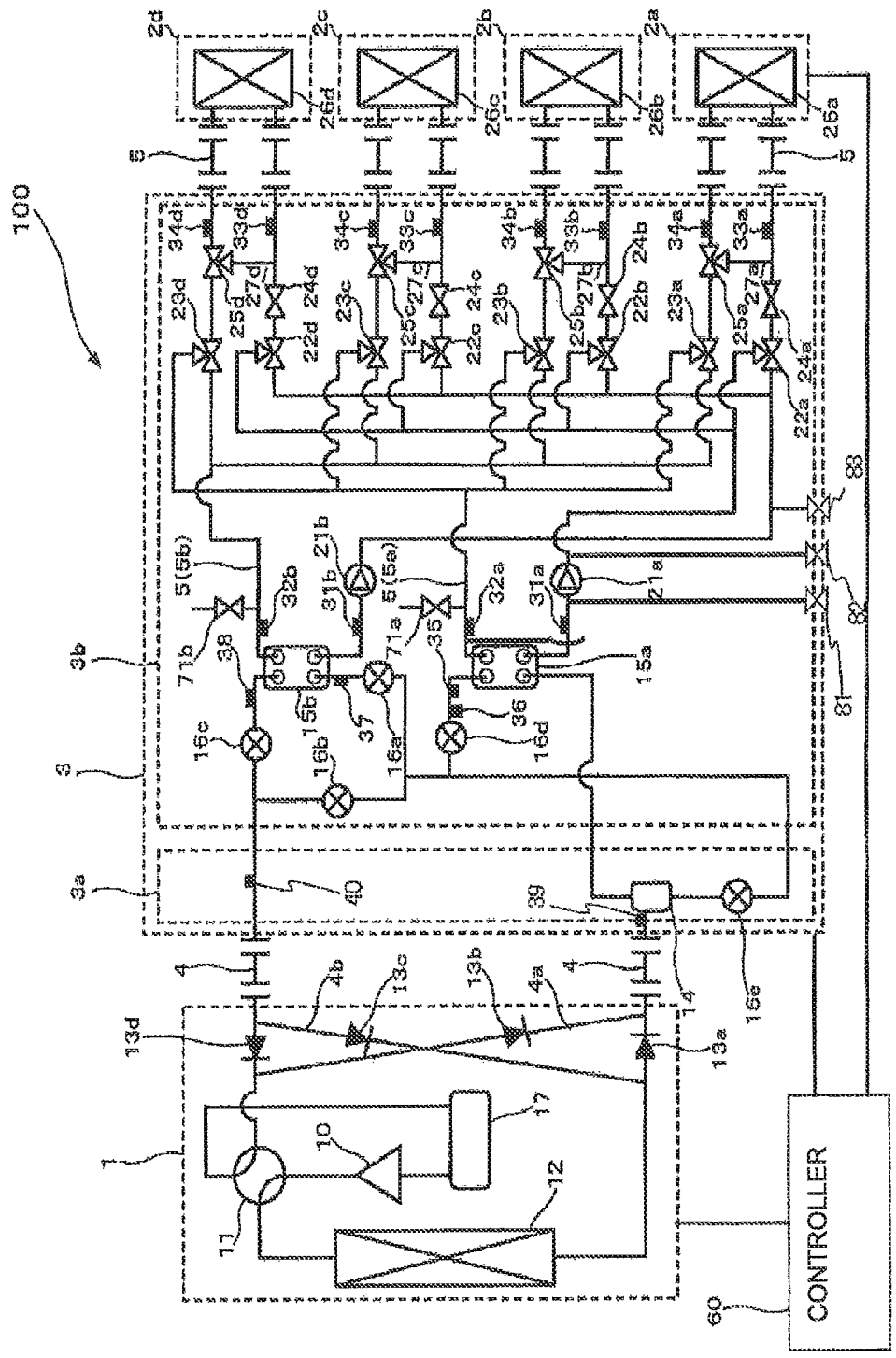
FIG. 3 is a schematic circuit diagram illustrating the structure of an air-conditioning apparatus 100 according to Embodiment 1 of the present invention.

FIG. 3 is a schematic circuit diagram illustrating the structure of an air-conditioning apparatus 100 according to Embodiment 1 of the present invention. The structure of the air-conditioning apparatus 100 will now be described in detail with reference to FIG. 3.

As illustrated in FIG. 3, the heat source device 1 and the relay unit 3 are connected to each other through a first intermediate heat exchanger 15a and a second intermediate heat exchanger 15b included in a second relay unit 3b. The relay unit 3 and each indoor unit 2 are also connected to each other through the first intermediate heat exchanger 15a and the second intermediate heat exchanger 15b included in the second relay unit 3b. The structure and function of each component of the air-conditioning apparatus 100 will be described below.

FIG. 3 and the following figures illustrate the case in which the relay unit 3 includes a first relay unit 3a and the second relay unit 3b.

(Heat Source Device 1)

As illustrated in FIG. 3, the heat source device 1 includes a compressor 10, a four-way valve 11, a heat-source-side heat exchanger (outdoor heat exchanger) 12, and an accumulator 17, which are connected in series by refrigerant pipes 4. The heat source device 1 further includes a first connection pipe 4a, a second connection pipe 4b, and cheek valves 13a to 13d. Since the first connection pipe 4a, the second connection pipe 4b, and the check valves 13a to 13d are provided, the direction in which a heat-source-side refrigerant guided into the relay unit 3 flows can be set to a certain direction irrespective of the operation required by the indoor unit 2.

The compressor 10 sucks the heat-source-side refrigerant and compresses the heat-source-side refrigerant into a high-temperature, high-pressure refrigerant. The compressor 10 may be constituted by, for example, a capacity-controllable inverter compressor.

The four-way valve 11 switches a passage of the heat-source-side refrigerant between a passage for the heating operation and a passage for the cooling operation.

The heat-source-side heat exchanger 12 functions as an evaporator during the heating operation and as a radiator during the cooling operation, and exchanges heat between air supplied from an air-sending device, such as a fan (not shown), and the heat-source-side refrigerant.

The accumulator 17 is provided on the suction side of the compressor 10, and stores excess refrigerant.

The check valve 13d is provided to the refrigerant pipe 4 between the relay unit 3 and the four-way valve 11, and allows the heat-source-side refrigerant to flow only in a predetermined direction (direction from the relay unit 3 to the heat source device 1).

The check valve 13a is provided to the refrigerant pipe 4 between the heat-source-side heat exchanger 12 and the relay unit 3, and allows the heat-source-side refrigerant to flow only in a predetermined direction (direction from the heat source device 1 to the relay unit 3).

The check valve 13b is provided to the first connection pipe 4a and allows the heat-source-side refrigerant to flow only in a direction from the downstream side of the check valve 13d to the downstream side of the check valve 13a.

The check valve 13c is provided to the second connection pipe 4b and allows the heat-source-side refrigerant to flow only in a direction from the upstream side of the check valve 13d to the upstream side of the check valve 13a.

The first connection pipe 4a connects the refrigerant pipe 4 on the downstream side of the check valve 13d and the refrigerant pipe 4 on the downstream side of the check valve 13a to each other in the heat source device 1.

The second connection pipe 4b connects the refrigerant pipe 4 on the upstream side of the check valve 13d and the refrigerant pipe 4 on the upstream side of the check valve 13a to each other in the heat source device 1.

Although FIG. 3 illustrates an example in which the first connection pipe 4a, the second connection pipe 4b, and the check valves 13a to 13d are provided, the configuration is not limited to this, and these components are not necessarily provided.

(Indoor Units 2)

As illustrated in FIG. 3, each of the indoor units 2 includes a use-side heat exchanger 26. The use-side heat exchanger 26 is connected to a corresponding stop valve 24 and flow control valve 25 of the second relay unit 3b through the corresponding pipes 5. The use-side heat exchanger 26 exchanges heat between the air supplied from an air-sending device, such as a fan (not shown), and the heat medium, thereby generating heating air or cooling air to be supplied to an air-conditioned space.

FIG. 3 illustrates an example in which four indoor units 2 are connected to the second relay unit 3b, and an indoor unit 2a, an indoor unit 2b, an indoor unit 2c, and an indoor unit 2d are arranged in that order from the bottom in FIG. 3. The use-side heat exchangers 26 of the indoor units 2a to 2d are a use-side heat exchanger 26a, a use-side heat exchanger 26b, a use-side heat exchanger 26c, and a use-side heat exchanger 26d, which are arranged in that order from the bottom in FIG. 3.

Similar to the case of FIG. 1, the number of indoor units 2 connected is not limited to four as shown in FIG. 3.

(Relay Unit 3)

As illustrated in FIG. 3, the relay unit 3 includes the first relay unit 3a and the second relay unit 3b, which are arranged in separate housings. This structure, as described above, enables a plurality of second relay units 3b to connect to a single first relay unit 3a.

The first relay unit 3a includes a gas-liquid separator 14, en expansion valve 16e, a pressure sensor 39, and a pressure sensor 40

The second relay unit 3b includes the two intermediate heat exchangers 15, four expansion valves 16, two pumps 21, four flow switching valves 22, four flow switching valves 23, tour stop valves 24, and four flow control valves 25.

The gas-liquid separator 14 is connected to a single refrigerant pipe 4 that is connected to the heat source device 1 and two refrigerant pipes 4 that are connected to the first intermediate heat exchanger 15a and the second intermediate heat exchanger 15b of the second relay unit 3b, and separates the heat-source-side refrigerant supplied from the heat source device 1 into the gas refrigerant and the liquid refrigerant.

The expansion valve 16e is provided between the refrigerant pipe 4 that connects the expansion valve 16a and the expansion valve 16b to each other and the gas-liquid separator 14. The expansion valve 16e functions as a pressure-reducing valve or an expansion device, and reduces the pressure of the heat-source-side refrigerant by expanding the heat-source-side refrigerant. The expansion valve 16e has a variably controllable opening degree, and may be constituted by, for example, an electronic expansion valve.

The pressure sensor 39 is provided on the refrigerant pipe 4 that connects the heat source device 1 and the gas-liquid separator 14 to each other, and detects a pressure of the heat-source-side refrigerant that flows into the gas-liquid separator 14 from the heat source device 1.

The pressure sensor 40 is provided on the refrigerant pipe 4 that connects the heat source device 1 to the refrigerant pipe 4 that connects the expansion valve 16b and the expansion valve 16c to each other, and detects a pressure of the heat-source-side refrigerant that flows out of the second relay unit 3b and into the heat source device 1.

Each of the two intermediate heat exchangers 15 (the first intermediate heat exchanger 15a and the second intermediate heat exchanger 15b) functions as a radiator or an evaporator, and exchanges heat between the heat-source-side refrigerant and the heat medium, thereby supplying cooling energy or heating energy generated in the heat source device 1 to the indoor unit 2. The first intermediate heat exchanger 15a is disposed between the gas-liquid separator 14 and the expansion valve 16d along the flow of the heat-source-side refrigerant, and contributes to heating of the heat medium. The second intermediate heat exchanger 15b is disposed between the expansion valve 16a and the expansion valve 16c along the flow of the heat-source-side refrigerant, and contributes to cooling of the heat medium.

Each of the four expansion valves 16 (expansion valves 16a to 16d) functions as a pressure-reducing valve or an expansion device, and reduces the pressure of the heat-source-side refrigerant by expanding the heat-source-side refrigerant. Each of the four expansion valves 16 has a variably controllable opening degree, and may be constituted by, for example, an electronic expansion valve.

The expansion valve 16a is provided between the expansion valve 16e and the second intermediate heat exchanger 15b.

The expansion valve 16b is provided to the refrigerant pipe 4 that connects the expansion valve 16a to the refrigerant pipe 4 that connects the heat source device 1 and the expansion valve 16c to each other.

The expansion valve 16c is provided between the second intermediate heat exchanger 15b and the first relay unit 3a.

The expansion valve 16d is provided to the refrigerant pipe 4 that connects the first intermediate heat exchanger 15a to the refrigerant pipe 4 that connects the expansion valve 16a and the expansion valve 16b to each other.

The two pumps 21 (first pump 21a and second pump 21b) are provided to circulate the heat medium that is guided through the pipes 5.

The first pump 21a is provided on the pipe 5 that extends between the first intermediate heat exchanger 15a and the flow switching valves 22.

The second pump 21b is provided on the pipe 5 that extends between the second intermediate heat exchanger 15b and the flow switching valves 22.

The first pump 21a and the second pump 21b are not particularly limited to those of a certain type and may be constituted by, for example, capacity-controllable pumps.

Each of the four flow switching valves 22 (flow switching valves 22a to 22d) is constituted by a three-way valve, and switches the passage of the heat medium. The flow switching valves 22 are provided to a number corresponding to the number of indoor units 2 installed (four in this example). Each of the flow switching valves 22 is provided at the inlet side of the heat medium passage of the corresponding use-side heat exchanger 26, with one of the three ports connected to the first pump 21a, another of the three ports to the second pump 21b, and the other of the three ports to the corresponding stop valve 24.

The flow switching valve 22a, the flow switching valve 22b, the flow switching valve 22c, and the flow switching valve 22d are arranged in accordance with the respective indoor units 2 in that order from the bottom in FIG. 3.

Each of the four flow switching valves 23 (flow switching valves 23a to 23d) is constituted by a three-way valve, and switches the passage of the heat medium. The flow switching valves 23 are provided to a number corresponding to the number of indoor units 2 installed (four in this example). Each of the flow switching valves 23 is provided at the outlet side of the heat medium passage of the corresponding use-side heat exchanger 26, with one of the three ports connected to the first intermediate heat exchanger 15a, another of the three ports to the second intermediate heat exchanger 15b, and the other of the three ports to the corresponding flow control valve 25.

The flow switching valve 23a, the flow switching valve 23b, the flow switching valve 23c, and the flow switching valve 23d are arranged in accordance with the respective indoor units 2 in that order from the bottom in FIG. 3.

Each of the four stop valves 24 (stop valves 24a to 24d) is constituted by a two-way valve, and opens/closes the corresponding respective pipe 5. The stop valves 24 are provided to a number corresponding to the number of indoor units 2 installed (four in this example). Each of the stop valves 24 is provided at the inlet side of the heat medium passage of the corresponding use-side heat exchanger 26, with one port connected to the use-side heat exchanger 26 and the other port to the corresponding flow switching valve 22.

The stop valve 24a, the stop valve 24b, the stop valve 24c, and the stop valve 24d are arranged in accordance with the respective indoor units 2 in that order from the bottom in FIG. 3.

Each of the four flow control valves 25 (flow control valves 25*a* to 25*d*) is constituted by a three-way valve, and switches the passage of the heat medium. The flow control valves 25 are provided to a number corresponding to the number of indoor units 2 (four in this example). Each of the flow control valves 25 is provided at the outlet side of the heat medium passage of the corresponding use-side heat exchanger 26, with one of the three ports connected to the use-side heat exchanger 26, another of the three ports to a corresponding bypass 27, and the other of the three ports to the corresponding flow switching valve 23.

The flow control valve 25*a*, the flow control valve 25*b*, the flow control valve 25*c*, and the flow control valve 25*d* are arranged in accordance with the respective indoor units 2 in that order from the bottom in FIG. 3.

Each bypass 27 is provided so as to connect the pipe 5 that extends between the corresponding stop valve 24 and the corresponding use-side heat exchanger 26 to the corresponding flow control valve 25. The bypasses 27 are provided to a number corresponding to the number of indoor units 2 installed (four in this example).

A bypass 27*a*, a bypass 27*b*, a bypass 27*c*, and a bypass 27*d* are arranged in accordance with the respective indoor units 2 in that order from the bottom in FIG. 3.

The second relay unit 3*b* further includes two first temperature sensors 31, two second temperature sensors 32, four third temperature sensors 33, four fourth temperature sensors 34, a fifth temperature sensor 35, a pressure sensor 36, a sixth temperature sensor 37, and a seventh temperature sensor 38. Information obtained by these detection means is transmitted to a controller 60 that controls the operation of the air-conditioning apparatus 100 and is used to control, for example, driving frequencies of the pumps 21 and switching of the passages of the heat medium flowing through the pipes 5.

The two first temperature sensors 31 (first temperature sensor 31*a* and first temperature sensor 31*b*) detect the temperature of the heat medium flowing out of the respective intermediate heat exchangers 15, that is, the temperature of the heat medium at the outlets of the respective intermediate heat exchangers 15, and may be constituted by, for example, thermistors. The first temperature sensor 31*a* is provided on the pipe 5 at the inlet side of the first pump 21*a*. The first temperature sensor 31*b* is provided on the pipe 5 at the inlet side of the second pump 21*b*.

The two second temperature sensors 32 (second temperature sensor 32*a* and second temperature sensor 32*b*) detect the temperature of the heat medium flowing into the respective intermediate heat exchangers 15, that is, the temperature of the heat medium at the inlets of the respective intermediate heat exchangers 15, and may be constituted by, for example, thermistors. The second temperature sensor 32*a* is provided on the pipe 5 at the inlet side of the first intermediate heat exchanger 15*a*. The second temperature sensor 32*b* is provided on the pipe 5 at the inlet side of the second intermediate heat exchanger 15*b*.

The four third temperature sensors 33 (third temperature sensors 33*a* to 33*d*) are provided at the inlet sides of the heat medium passages of the respective use-side heat exchangers 26 to detect the temperature of the heat medium that flows into the use-side heat exchangers 26, and may be constituted by, for example, thermistors. The third temperature sensors 33 are provided to a number corresponding to the number of indoor units 2 installed (four in this example).

The third temperature sensor 33*a*, the third temperature sensor 33*b*, the third temperature sensor 33*c*, and the third temperature sensor 33*d* are arranged in accordance with the respective indoor units 2 in that order from the bottom in FIG. 3.

The four fourth temperature sensors 34 (fourth temperature sensors 34*a* to 34*d*) are provided at the outlet sides of the heat medium passages of the respective use-side heat exchangers 26 to detect the temperature of the heat medium that flows out of the use-side heat exchangers 26, and may be constituted by, for example, thermistors. The fourth temperature sensors 34 are provided to a number corresponding to the number of indoor units 2 installed (four in this example).

The fourth temperature sensor 34*a*, the fourth temperature sensor 34*b*, the fourth temperature sensor 34*c*, and the fourth temperature sensor 34*d* are arranged in accordance with the respective indoor units 2 in that order from the bottom in FIG. 3.

The fifth temperature sensor 35 is provided at the outlet side of the heat-source-side refrigerant passage of the first intermediate heat exchanger 15*a* to detect the temperature of the heat-source-side refrigerant that flows out of the first intermediate heat exchanger 15*a*, and may be constituted by, for example, a thermistor.

The pressure sensor 36 is provided at the outlet side of the heat-source-side refrigerant passage of the first intermediate heat exchanger 15*a* to detect the pressure of the heat-source-side refrigerant flowing out of the first intermediate heat exchanger 15*a*.

The sixth temperature sensor 37 is provided at the inlet side of the heat-source-side refrigerant passage of the second intermediate heat exchanger 15*b* to detect the temperature of the heat-source-side refrigerant that flows into the second intermediate heat exchanger 15*b*, and may be constituted by, for example, a thermistor.

The seventh temperature sensor 38 is provided at the outlet side of the heat-source-side refrigerant passage of the second intermediate heat exchanger 15*b* to detect the temperature of the heat-source-side refrigerant that flows out of the second intermediate heat exchanger 15*b*, and may be constituted by, for example, a thermistor.

The pipes 5 through which the heat medium is guided include pipes connected to the first intermediate heat exchanger 15*a* (hereinafter referred to as pipes 5*a*) and pipes connected to the second intermediate heat exchanger 15*b* (hereinafter referred to as pipes 5*b*). The pipes 5*a* and the pipes 5*b* are divided into branches, the number of which corresponds to the number of indoor units 2 connected to the relay unit 3 (four in this example). The pipes 5*a* and the pipes 5*b* are connected to one another other by the flow switching valves 22 and the flow switching valves 23. The controller 60 can control whether to cause the heat medium guided through the pipes 5*a* to flow into the use-side heat exchangers 26 or cause the heat medium guided through the pipes 5*b* to flow into the use-side heat exchangers 26 by switching the flow with the flow switching valves 22 and the flow switching valves 23.

The air-conditioning apparatus 100 further includes the controller 60, such as a microcomputer, which controls the operations of the heat source device 1, the relay unit 3, and devices mounted in the indoor units 2 on the basis of information from each detection means and a remote controller for receiving an instruction from a user. The controller 60 performs operation in each of operation modes described below by controlling, for example, the driving frequency of the compressor 10 mounted in the heat source device 1, the rotational speed (and the ON/OFF state) of the air-sending device installed in the vicinity of the heatsource-side heat exchanger 12, and switching of the four-way valve 11. In addition, the controller 60 controls the rotational speed (and the ON/OFF state) of the air-sending device installed in the vicinity of the use-side heat exchanger 26 mounted in each indoor unit 2. Moreover, the controller 60 controls the driving frequencies of the pumps 21 mounted in the relay unit 3, the opening degrees of the expansion valves 16a to 16e, the flow switching states of the flow switching valves 22 and the flow switching valves 23, the open-closed states of the stop valves 24, and the flow rate of the heat medium adjusted by the flow control valves 25. Thus, the controller 60 functions as flow-rate control means that adjusts a flow rate of the heat medium in the relay unit 3, passage determination means that determines the passage of the heat medium, ON/OFF control means that turns on and off each device, and control-target-value changing means that changes a set target value as appropriate on the basis of information from each detection means.

Referring to FIG. 3, the controller 60 collectively controls each of the devices included in the heat source device 1, the indoor units 2, and the relay unit 3. However, the controller 60 is not limited to this, and may instead be provided for each unit. In this case, the controllers are preferably configured so as to be capable of communicating with each other.

In the air-conditioning apparatus 100 according to Embodiment 1, a refrigeration cycle is formed by connecting the compressor 10, the four-way valve 11, the heat-source-side heat exchanger 12, the refrigerant passage of the first intermediate heat exchanger 15a, the refrigerant passage of the second intermediate heat exchanger 15b, and the accumulator 17 with the refrigerant pipes 4 through which the refrigerant flows. Also, a heating heat medium circuit is formed by successively connecting the heat medium passage of the first intermediate heat exchanger 15a, the first pump 21a, and the use-side heat exchangers 26 with the pipes 5a through which the heat medium flows. Similarly, a cooling heat medium circuit is formed by successively connecting the heat medium passage of the second intermediate heat exchanger 15b, the second pump 21b, and the use-side heat exchangers 26 with the pipes 5b through which the heat medium flows. Thus, a plurality of use-side heat exchangers 26 are connected in parallel to each of the intermediate heat exchangers 15, so that multiple series of heat medium circuits can be provided.

In the heating heat medium circuit, a discharge valve 71a for discharging the heat medium from the heating heat medium circuit is disposed to one of the pipes 5a. Also, in the cooling heat medium circuit, a discharge valve 71b for discharging the heat medium from the cooling heat medium circuit is disposed to one of the pipes 5b.

A heat-medium supply valve 81 is connected to a pipe 5a that branches from the pipe 5a at the suction side of the first pump 21a of the heating heat medium circuit. A safety valve 82 is connected to a pipe 5a that branches from the pipe 5a at the discharge side of the first pump 21a of the heating eat medium circuit. An air purge valve 83 is connected to a pipe 5b that branches from the pipe 5b at the discharge side of the second pump 21b of the cooling heat medium circuit. The operations of the heat-medium supply valve 81, the safety valve 82, and the air purge valve 83 will be described below.

The locations of the heat-medium supply valve 81 and the air purge valve 83 in the heat medium circuit are not limited to those in FIG. 3.

As described above, in the air-conditioning apparatus 100, the heat source device 1 is connected to the relay unit 3 by the first intermediate heat exchanger 15a and the second intermediate heat exchanger 15b included in the relay unit 3, and the relay unit 3 is connected to the indoor units 2 by the first intermediate heat exchanger 15a and the second intermediate heat exchanger 15b. The first intermediate heat exchanger 15a and the second intermediate heat exchanger 15b exchange heat between the heat-source-side refrigerant, which is a primary refrigerant that circulates through the refrigeration cycle, and the heat medium, which is a secondary refrigerant that circulates through the heat medium circuit.

The types of refrigerants used in the refrigeration cycle and the heat medium circuit will now be described. In the refrigeration cycle, a zeotropic refrigerant mixture, such as R407C, a near-azeotropic refrigerant mixture, such as R410A or R404A, or a single refrigerant, such as R22 or R134a, may be used. Alternatively, a natural refrigerant, such as carbon dioxide or hydrocarbon, may instead be used. When a natural refrigerant is used as the heat-source-side refrigerant, the Earth's greenhouse effect caused by a leakage of the refrigerant can be suppressed. In particular, carbon dioxide exchanges heat in a supercritical state without being condensed at the high-pressure side. Therefore, when the first intermediate heat exchanger 15a and the second intermediate heat exchanger 15b are configured such that the heat-source-side refrigerant and the heat medium flow therethrough in a countercurrent manner as illustrated in FIG. 3, the heat exchange performance can be improved when the heat medium is heated or cooled.

As described above, the heat medium circuit includes the use-side heat exchangers 26 of the indoor units 2 as components thereof. Therefore, in the air-conditioning apparatus 100, it is assumed that a highly safe heat medium is used in consideration of a possibility that the heat medium may leak into a room or the like where the indoor units 2 are installed. Therefore, for example, water, antifreezing fluid, or a mixture of water and antifreezing fluid may be used as the heat medium. In the case where these materials are used as the heat medium, even when the heat medium leaks from the pipes, high reliability can be achieved because the heat medium is highly safe. When the indoor units 2 are installed in a space where moisture is preferably not present, such as a computer room, a fluorine inactive liquid having a high thermal insulation performance can be used as the heat medium.

The flow switching valves 22, the flow switching valves 23, the stop valves 24, and the flow control valves 25 correspond to "flow switching means" according to the present invention.

(Operation Modes of Air-Conditioning Apparatus 100)

The operation modes of the operation performed by the air-conditioning apparatus 100 of Embodiment 1 will now be described.

The air-conditioning apparatus 100 is capable of performing a cooling operation or a heating operation with each indoor unit 2 thereof on the basis of an instruction from the indoor unit 2. More specifically, the air-conditioning apparatus 100 is capable of performing the same operation with all of the indoor units 2, and is also capable of performing different operations with each indoor unit 2. In other words, the air-conditioning apparatus 100 is capable of performing cooling and heating operations simultaneously. Four operation modes of the operation performed by the air-conditioning apparatus 100, which are a cooling only operation mode in which all of the running indoor units 2 perform the cooling operation, a heating only operation mode in which all of the running indoor units 2 perform the heating operation, a cooling main operation mode in which a cooling load is larger than a heating load, and a heating main operation mode in which a heating load is larger than a cooling load, will now be described together with the flow of the refrigerant.

(Cooling Only Operation Mode)

Figure 4:
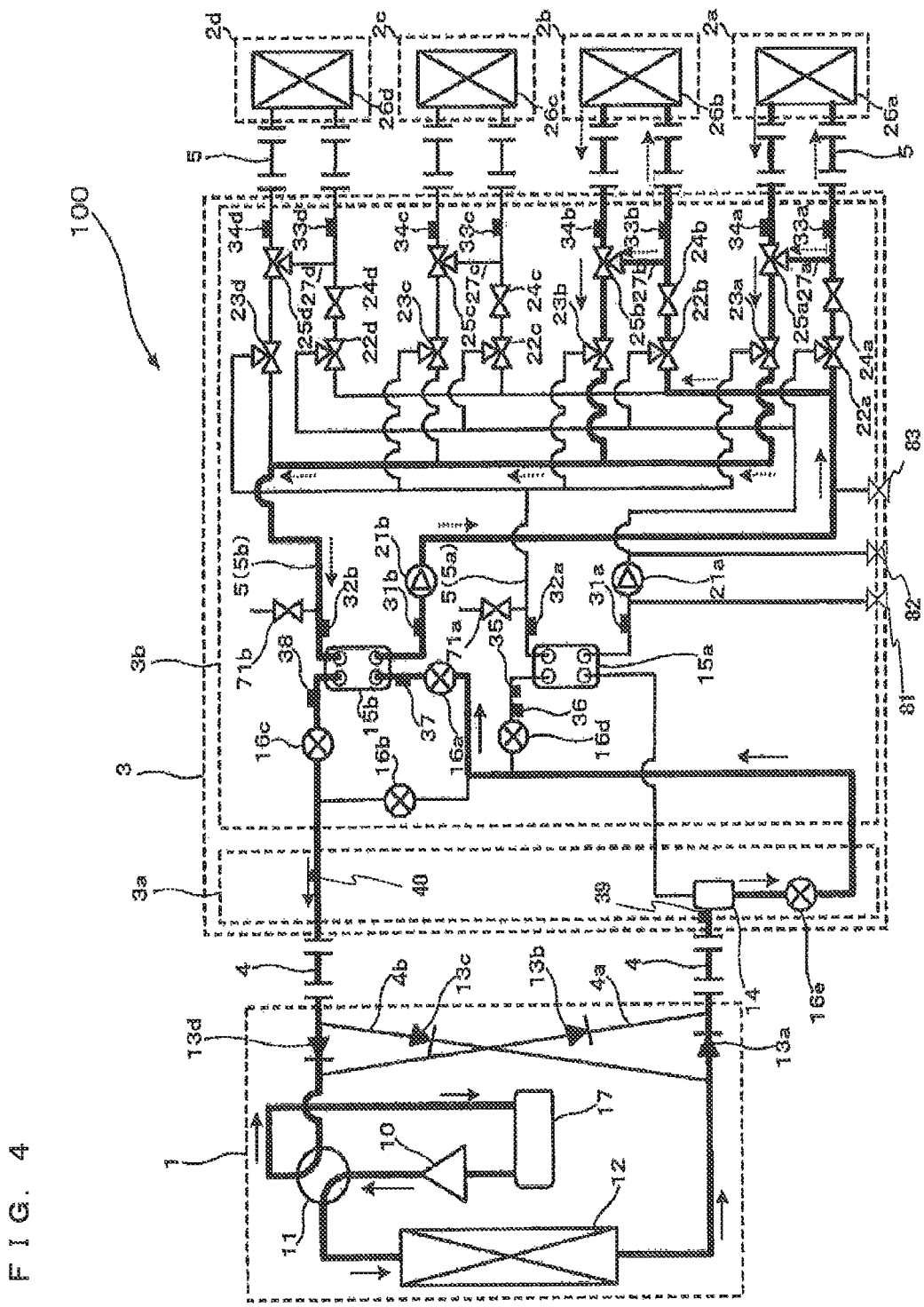
FIG. 4 is a refrigerant circuit diagram illustrating the flow of refrigerants in a cooling only operation mode in the air-conditioning apparatus 100 according to Embodiment 1 of the present invention.

FIG. 4 is a refrigerant circuit diagram illustrating the flow of the refrigerants in the cooling only operation mode in the air-conditioning apparatus 100 according to Embodiment 1 of the present invention. The cooling only operation mode will be described with reference to FIG. 4 by using an example in which a cooling load is generated only in the use-side heat exchanger 26a and the use-side heat exchanger 26b.

In FIG. 4, the pipes through which the refrigerants (the heat-source-side refrigerant and the heat medium) circulate are shown by bold lines. The directions in which the heat-source-side refrigerant flows are indicated by solid-line arrows, and the directions in which the heat medium flows are indicated by broken-line arrows.

When the cooling only operation mode illustrated in FIG. 4 is performed, in the heat source device 1, the four-way valve 11 is switched so that the heat-source-side refrigerant discharged from the compressor 10 flows into the heat-source-side heat exchanger 12. In the relay unit 3, the first pump 21a is stopped, and only the second pump 21b is driven. In addition, the stop valve 24a and the stop valve 24b are opened, and the stop valve 24c and the stop valve 24d are closed. Accordingly, the heat medium circulates between the second intermediate heat exchanger 15b and each of the use-side heat exchanger 26a and the use-side heat exchanger 26b. In addition, in the relay unit 3, the opening degrees of the expansion valve 16b and the expansion valve 16d are set to small values so that the refrigerant does not flow therethrough, and the expansion valve 16c and the expansion valve 16e are fully opened so that no pressure drop occurs. In this state, the operation of the compressor 10 is started.

First, the flow of the heat-source-side refrigerant in the refrigeration cycle will be described.

A low-temperature, low-pressure gas refrigerant is compressed by the compressor 10 and converted into a high-temperature, high-pressure refrigerant, and is discharged. The high-temperature, high-pressure refrigerant discharged from the compressor 10 passes through the four-way valve 11 and flows into the heat-source-side heat exchanger 12. Then, the refrigerant transfers heat to the outside air in the heat-source-side heat exchanger 12, and is converted into a high-pressure refrigerant. The high-pressure refrigerant that has flowed out of the heat-source-side heat exchanger 12 passes through the check valve 13a, flows out of the heat source device 1, and flows into the first relay unit 3a through the corresponding refrigerant pipe 4.

The high-pressure refrigerant that has flowed into the first relay unit 3a flows into the gas-liquid separator 14, and then flows into the second relay unit 3b through the expansion valve 16e. The high-pressure refrigerant that has flowed into the second relay unit 3b is expanded and decompressed by the expansion valve 16a, and is converted into a low-temperature, low-pressure two-phase gas-liquid refrigerant. The two-phase gas-liquid refrigerant flows into the second intermediate heat exchanger 15b, which functions as an evaporator, and takes heat away from the heat medium which circulates through the heat medium circuit. Thus, the two-phase gas-liquid refrigerant is converted into a low-temperature, low-pressure gas refrigerant while cooling the heat medium. The gas refrigerant that has flowed out of the second intermediate heat exchanger 15b passes through the expansion valve 16c, flows out of the second relay unit 3b and the first relay unit 3a, and flows into the heat source device 1 through the corresponding refrigerant pipe 4.

The refrigerant that has flowed into the heat source device 1 passes through the check valve 13d and is sucked into the compressor 10 again through the four-way valve 11 and the accumulator 17.

Next, the flow of the heat medium in the heat medium circuit will be described.

In the cooling only operation mode, since the first pump 21a is stopped, the heat medium circulates through the pipes 5b. The heat medium that has been cooled by the heat-source-side refrigerant in the second intermediate heat exchanger 15b is caused to circulate through the pipes 5b by the second pump 21b. The heat medium that has been pressurized by the second pump 21b and flowed out therefrom passes through the flow switching valves 22 (the flow switching valve 22a and the flow switching valve 22b) and the stop valves 24 (the stop valve 24a and the stop valve 24b), and flows into the use-side heat exchangers 26 (the use-side heat exchanger 26a and the use-side heat exchanger 26b). Then, the heat medium takes heat away from the indoor air in the use-side heat exchangers 26, thereby cooling the air-conditioned space, such as the inside of the room where the indoor units 2 are installed.

After that, the heat medium that has flowed out of the use-side heat exchangers 26 flows into the flow control valves 25 (the flow control valve 25a and the flow control valve 25b). At this time, the flow control valves 25 operate so as to adjust the flow rate of the heat medium so that only an amount of heat medium required to cover the air conditioning load needed in the air-conditioned space, such as the inside of the room, flows into the use-side heat exchangers 26, and the remaining heat medium flows through the bypasses 27 (the bypass 27a and the bypass 27b) so as to bypass the use-side heat exchangers 26. The heat medium that has passed through the bypasses 27 merges with the heat medium that has passed through the use-side heat exchangers 26 without contributing to the heat exchange, passes through the flow switching valves 23 (the flow switching valve 23a and the flow switching valve 23b), and flows into the second intermediate heat exchanger 15b again.

The air conditioning load needed in the air-conditioned space, such as the inside of the room, can be covered by controlling the operation with the controller 60 so that the differences between the temperatures obtained by the third temperature sensors 33 and the respective fourth temperature sensors 34 are maintained at respective target values.

When a cooling load is generated by the use-side heat exchanger 26c or the use-side heat exchanger 26d, the stop valve 24c or the stop valve 24d may be opened to circulate the heat medium.

(Heating Only Operation Mode)

Figure 5:
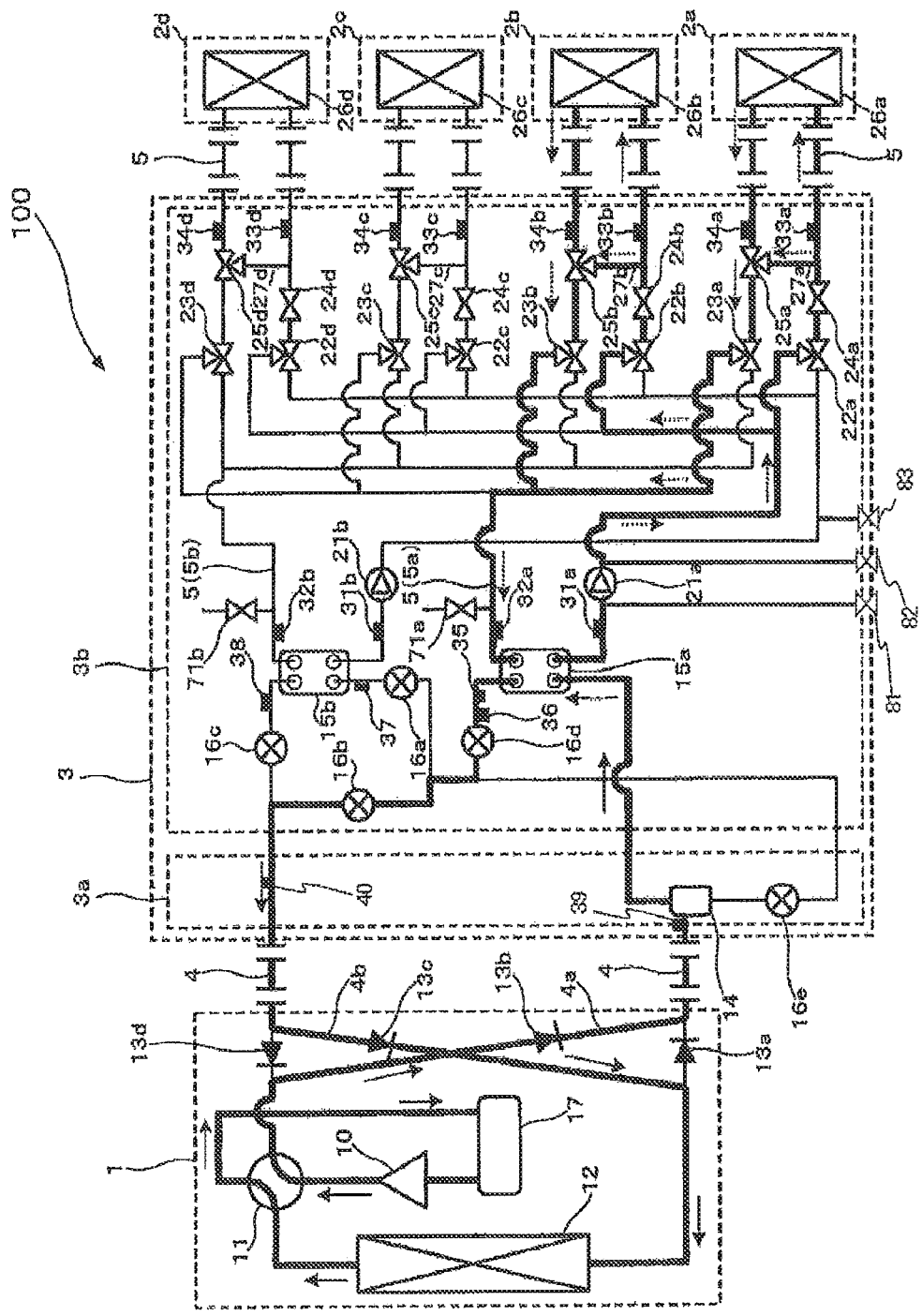
FIG. 5 is a refrigerant circuit diagram illustrating the flow of the refrigerants in a heating only operation mode in the air-conditioning apparatus 100 according to Embodiment 1 of the present invention.

FIG. 5 is a refrigerant circuit diagram illustrating the flow of the refrigerants in the heating only operation mode in the air-conditioning apparatus 100 according to Embodiment 1 of the present invention. The heating only operation mode will be described with reference to FIG. 5 by using an example in which a heating load is generated only in the use-side heat exchanger 26a and the use-side heat exchanger 26b.

In FIG. 5, the pipes through which the refrigerants (the heat-source-side refrigerant and the heat medium) circulate are shown by bold lines. The directions in which the heat-source-side refrigerant flows are indicated by solid-line arrows, and the directions in which the heat medium flows are indicated by broken-line arrows.

When the heating only operation mode illustrated in FIG. 5 is performed, in the heat source device 1, the four-way valve 11 is switched so that the heat-source-side refrigerant discharged from the compressor 10 flows into the relay unit 3 without passing through the heat-source-side heat exchanger 12. In the relay unit 3, only the first pump 21a is driven, and the second pump 21b is stopped. In addition, the stop valve 24a and the stop valve 24b are opened, and the stop valve 24c and the stop valve 24d are closed. Accordingly, the heat medium circulates between the first intermediate heat exchanger 15a and each of the use-side heat exchanger 26a and the use-side heat exchanger 26b. In addition, in the relay unit 3, the opening degrees of the expansion valve 16a, the expansion valve 16c, and the expansion valve 16e are set to small values so that the refrigerant does not flow therethrough, and the expansion valve 16b is fully opened so that no pressure drop occurs. In this state, the operation of the compressor 10 is started.

First, the flow of the heat-source-side refrigerant in the refrigeration cycle will be described.

A low-temperature, low-pressure gas refrigerant is compressed by the compressor 10 and converted into a high-temperature, high-pressure refrigerant, and is discharged. The high-temperature, high-pressure refrigerant discharged from the compressor 10 passes through the four-way valve 11, the first connection pipe 4a, and the check valve 13b, and flows out of the heat source device 1. The high-temperature, high-pressure refrigerant that has flowed out of the heat source device 1 flows into the first relay unit 3a through the corresponding refrigerant pipe 4.

The high-temperature, high-pressure refrigerant that has flowed into the first relay unit 3a flows into the gas-liquid separator 14, and then flows into the first intermediate heat exchanger 15a. The high-temperature, high-pressure refrigerant that has flowed into the first intermediate heat exchanger 15a transfers heat to the heat medium which circulates through the heat medium circuit, thereby being converted into a high-pressure refrigerant while heating the heat medium. The high-pressure refrigerant that has flowed out of the first intermediate heat exchanger 15a is expanded and decompressed by the expansion valve 16d, and is converted into a low-temperature, low-pressure two-phase gas-liquid refrigerant. The two-phase gas-liquid refrigerant flows through the expansion valve 16b, and flows into the heat source device 1 again through the corresponding refrigerant pipe 4.

The two-phase gas-liquid refrigerant that has flowed into the heat source device 1 passes through the second connection pipe 4b and the check valve 13c, and flows into the heat-source-side heat exchanger 12, which functions as an evaporator. The two-phase gas-liquid refrigerant that has flowed into the heat-source-side heat exchanger 12 takes heat away from the outdoor air, and is converted into a low-temperature, low-pressure gas refrigerant. The low-temperature, low-pressure gas refrigerant that has flowed out of the heat-source-side heat exchanger 12 is sucked into the compressor 10 again through the four-way valve 11 and the accumulator 17.

Next, the flow of the heat medium in the heat medium circuit will be described.

In the heating only operation mode, since the second pump 21b is stopped, the heat medium circulates through the pipes 5a. The heat medium that has been heated by the heat-source-side refrigerant in the first intermediate heat exchanger 15a is caused to circulate through the pipes 5a by the first pump 21a. The heat medium that has been pressurized by the first pump 21a and flowed out therefrom passes through the flow switching valves 22 (the flow switching valve 22a and the flow switching valve 22b) and the stop valves 24 (the stop valve 24a and the stop valve 24b), and flows into the use-side heat exchangers 26 (the use-side heat exchanger 26a and the use-side heat exchanger 26b).

Then, the heat medium heats the indoor air in the use-side heat exchangers 26, thereby heating the air-conditioned space, such as the inside of the room where the indoor units 2 are installed.

After that, the heat medium that has flowed out of the use-side heat exchangers 26 flows into the flow control valves 25 (the flow control valve 25a and the flow control valve 25b). At this time, the flow control valves 25 operate so as to adjust the flow rate of the heat medium so that only an amount of heat medium required to cover the air conditioning load needed in the air-conditioned space, such as the inside of the room, flows into the use-side heat exchangers 26, and the remaining heat medium flows through the bypasses 27 (the bypass 27a and the bypass 27b) so as to bypass the use-side heat exchangers 26. The heat medium that has passed through the bypasses 27 merges with the heat medium that has passed through the use-side heat exchangers 26 without contributing to the heat exchange, passes through the flow switching valves 23 (the flow switching valve 23a and the flow switching valve 23b), and flows into the first intermediate heat exchanger 15a again.

The air conditioning load needed in the air-conditioned space, such as the inside of the room, can be covered by controlling the operation with the controller 60 so that the differences between the temperatures obtained by the third temperature sensors 33 and the respective fourth temperature sensors 34 are maintained at respective target values.

When a heating load is generated by the use-side heat exchanger 26c or the use-side heat exchanger 26d, the stop valve 24c or the stop valve 24d may be opened to circulate the heat medium.

(Cooling Main Operation Mode)

Figure 6:
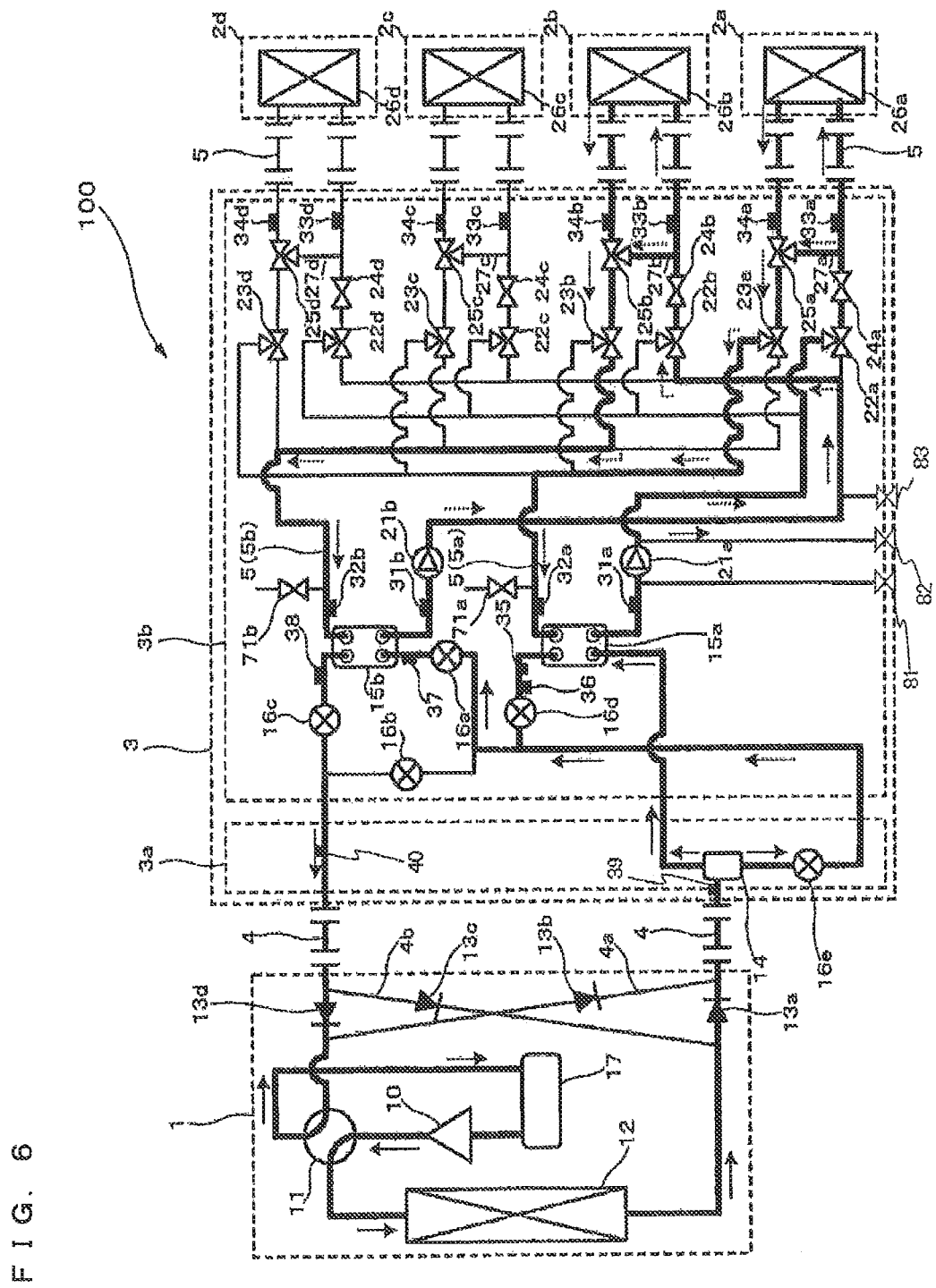
FIG. 6 is a refrigerant circuit diagram illustrating the flow of the refrigerants in a cooling main operation mode in the air-conditioning apparatus 100 according to Embodiment 1 of the present invention.

FIG. 6 is a refrigerant circuit diagram illustrating the flow of the refrigerants in the cooling main operation mode in the air-conditioning apparatus 100 according to Embodiment 1 of the present invention. The cooling main operation mode will be described with reference to FIG. 6 by using an example in which a heating load is generated in the use-side heat exchanger 26a and a cooling load is generated in the use-side heat exchanger 26b.

In FIG. 6, the pipes through which the refrigerants (the heat-source-side refrigerant and the heat medium) circulate are shown by bold lines. The directions in which the heat-source-side refrigerant flows are indicated by solid-line arrows, and the directions in which the heat medium flows are indicated by broken-line arrows.

When the cooling main operation mode illustrated in FIG. 6 is performed, in the heat source device 1, the four-way valve 11 is switched so that the heat-source-side refrigerant discharged from the compressor 10 flows into the heat-source-side heat exchanger 12. In the relay unit 3, the first pump 21a and the second pump 21b are driven. In addition, the stop valve 24a and the stop valve 24b are opened, and the stop valve 24c and the stop valve 24d are closed. Accordingly, the heat medium circulates between the first intermediate heat exchanger 15a and the use-side heat exchanger 26a and between the second intermediate heat exchanger 15b and the use-side heat exchanger 26b. In addition, in the relay unit 3, the opening degree of the expansion valve 16b is set to a small value so that the refrigerant does not flow therethrough, and the expansion valve 16c, the expansion valve 16d, and the expansion valve 16e are fully opened so that no pressure drop occurs. In this state, the operation of the compressor 10 is started.

First, the flow of the heat-source-side refrigerant in the refrigeration cycle will be described.

A low-temperature, low-pressure gas refrigerant is compressed by the compressor 10 and converted into a high-temperature, high-pressure refrigerant, and is discharged. The high-temperature, high-pressure refrigerant discharged from the compressor 10 passes through the four-way valve 11 and flows into the heat-source-side heat exchanger 12. Then, the refrigerant transfers heat to the outside air in the heat-source-side heat exchanger 12, and is converted into a two-phase gas-liquid refrigerant. The two-phase gas-liquid refrigerant that has flowed out of the heat-source-side heat exchanger 12 passes through the check valve 13a, flows out of the heat source device 1, and flows into the first relay unit 3a through the corresponding refrigerant pipe 4.

The two-phase gas-liquid refrigerant that has flowed into the first relay unit 3a flows into the gas-liquid separator 14, and is separated into a gas refrigerant and a liquid refrigerant, which flow into the second relay unit 3b.

The gas refrigerant that has separated in the gas-liquid separator 14 flows into the first intermediate heat exchanger 15a. The gas refrigerant that has flowed into the first intermediate heat exchanger 15a is condensed while transferring heat to the heat medium, which circulates through the heat medium circuit, and is converted into a liquid refrigerant. The liquid refrigerant that has flowed out of the first intermediate heat exchanger 15a passes through the expansion valve 16d.

The liquid refrigerant that has separated in the gas-liquid separator 14 passes through the expansion valve 16e and merges with the liquid refrigerant that has been condensed in the first intermediate heat exchanger 15a and has passed through the expansion valve 16d. Then, the liquid refrigerant is expanded and decompressed by the expansion valve 16a and converted into a low-temperature, low-pressure two-phase gas-liquid refrigerant, which flows into the second intermediate heat exchanger 15b.

The two-phase gas-liquid refrigerant takes heat away from the heat medium which circulates through the heat medium circuit in the second intermediate heat exchanger 15b, which functions as an evaporator, and is thereby converted into a low-temperature, low-pressure gas refrigerant while cooling the heat medium. The gas refrigerant that has flowed out of the second intermediate heat exchanger 15b passes through the expansion valve 16c, flows out of the second relay unit 3b and the first relay unit 3a, and flows into the heat source device 1 through the corresponding refrigerant pipe 4.

The refrigerant that has flowed into the heat source device 1 passes through the check valve 13d and is sucked into the compressor 10 again through the four-way valve 11 and the accumulator 17.

Next, the flow of the heat medium in the heat medium circuit will be described.

In the cooling main operation mode, since the first pump 21a and the second pump 21b are both driven, the heat medium circulates through both the pipes 5a and the pipes 5b. The heat medium that has been heated by the heat-source-side refrigerant in the first intermediate heat exchanger 15a is caused to circulate through the pipes 5a by the first pump 21a. The heat medium that has been cooled by the heat-source-side refrigerant in the second intermediate heat exchanger 15b is caused to circulate through the pipes 5b by the second pump 21b.

The heat medium that has been pressurized by the first pump 21a and flowed out therefrom passes through the flow switching valve 22a and the stop valve 24a, and flows into the use-side heat exchanger 26a. Then, the heat medium heats the indoor air in the use-side heat exchanger 26a, thereby heating the air-conditioned space, such as the inside of the room where the corresponding indoor unit 2 is installed.

The heat medium that has been pressurized by the second pump 21b and flowed out therefrom passes through the flow switching valve 22b and the stop valve 24b, and flows into the use-side heat exchanger 26b. Then, the heat medium takes heat away from the indoor air in the use-side heat exchanger 26b, thereby cooling the air-conditioned space, such as the inside of the room where the corresponding indoor unit 2 is installed.

After that, the heat medium that has contributed to heating flows out of the use-side heat exchanger 26a, and flows into the flow control valve 25a. At this time, the flow control valve 25a operates so as to adjust the flow rate of the heat medium so that only an amount of heat medium required to cover the air conditioning load needed in the air-conditioned space, such as the inside of the room, flows into the use-side heat exchanger 26a, and the remaining heat medium flows through the bypass 27a so as to bypass the use-side heat exchanger 26a. The heat medium that has passed through the bypass 27a merges with the heat medium that has passed through the use-side heat exchanger 26a without contributing to the heat exchange, passes through the flow switching valve 23a, and flows into the first intermediate heat exchanger 15a again.

Similarly, the heat medium that has contributed to cooling flows out of the use-side heat exchanger 26b, and flows into the flow control valve 25b. At this time, the flow control valve 25b operates so as to adjust the flow rate of the heat medium so that only an amount of heat medium required to cover the air conditioning load needed in the air-conditioned space, such as the inside of the room, flows into the use-side heat exchanger 26b, and the remaining heat medium flows through the bypass 27b so as to bypass the use-side heat exchanger 26b. The heat medium that has passed through the bypass 27b merges with the heat medium that has passed through the use-side heat exchanger 26b without contributing to the heat exchange, passes through the flow switching valve 23b, and flows into the second intermediate heat exchanger 15b again.

During this period, owing to the functions of the flow switching valves 22 (the flow switching valve 22a and the flow switching valve 22b) and the flow switching valves 23 (the flow switching valve 23a and the flow switching valve 23b), the hot heat medium (the heat medium used for the heating load) and the cold heat medium (the heat medium used for the cooling load) flow into the use-side heat exchanger 26a having the heating load and the use-side heat exchanger 26b having the cooling load, respectively, without being mixed.

The air conditioning loads needed in the air-conditioned space, such as the inside of the room, can be covered by controlling the operation with the controller 60 so that the differences between the temperatures obtained by the third temperature sensors 33 and the respective fourth temperature sensors 34 are maintained at respective target values.

When a heating load or a cooling load is generated by the use-side heat exchanger 26c or the use-side heat exchanger 26d, the stop valve 24c or the stop valve 24d may be opened to circulate the heat medium.

(Heating Main Operation Mode)

Figure 7:
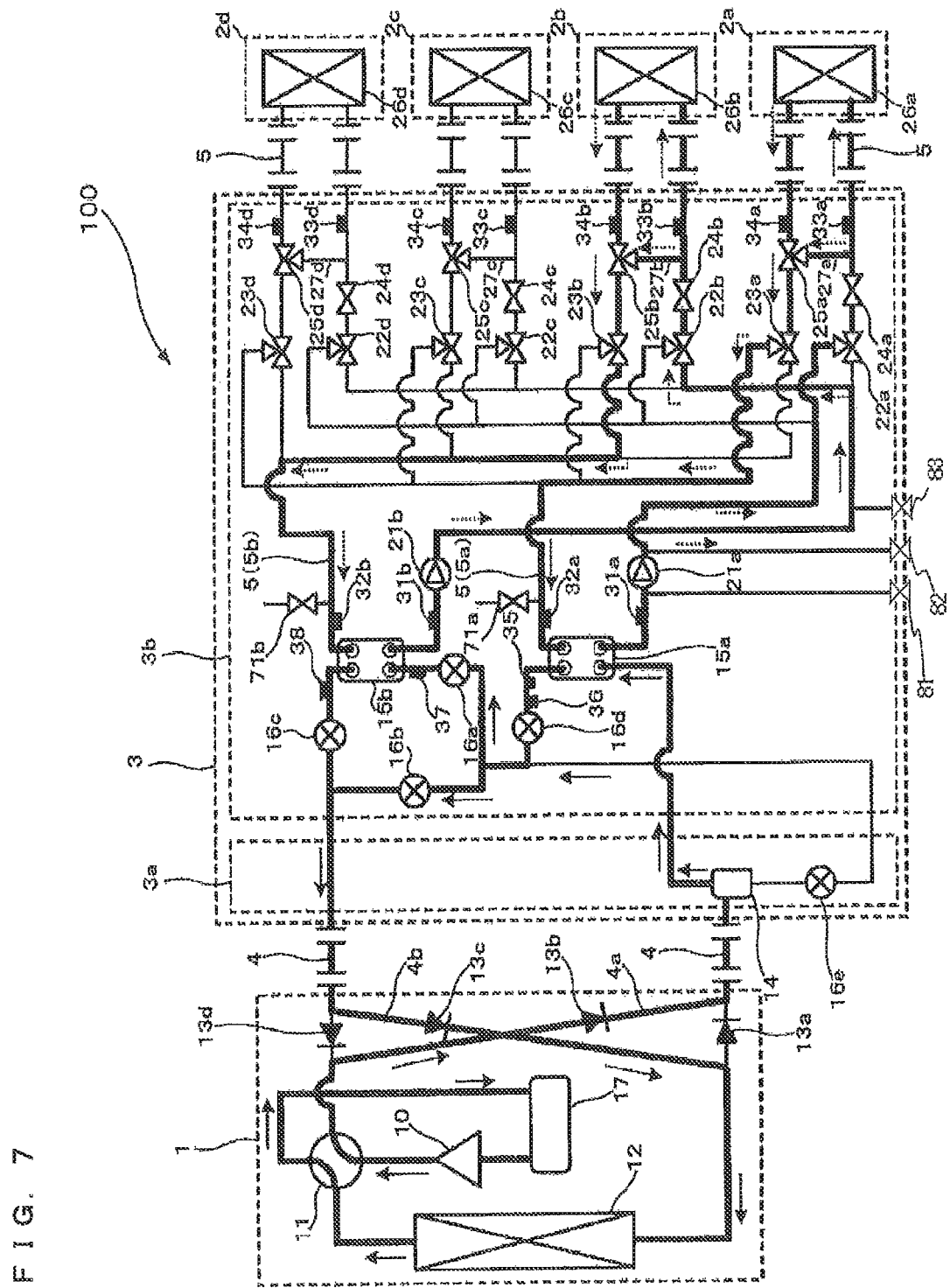
FIG. 7 is a refrigerant circuit diagram illustrating the flow of the refrigerants in a heating main operation mode in the air-conditioning apparatus 100 according to Embodiment 1 of the present invention.

FIG. 7 is a refrigerant circuit diagram illustrating the flow of the refrigerants in the heating main operation mode in the air-conditioning apparatus 100 according to Embodiment 1 of the present invention. The heating main operation mode will be described with reference to FIG. 7 by using an example in which a heating load is generated in the use-side heat exchanger 26a and a cooling load is generated in the use-side heat exchanger 26b.

In FIG. 7, the pipes through which the refrigerants (the heat-source-side refrigerant and the heat medium) circulate are shown by bold lines. The directions in which the heat-source-side refrigerant flows are indicated by solid-line arrows, and the directions in which the heat medium flows are indicated by broken-line arrows.

When the heating main operation mode illustrated in FIG. 7 is performed, in the heat source device 1, the four-way valve 11 is switched so that the heat-source-side refrigerant discharged from the compressor 10 flows into the relay unit 3 without passing through the heat-source-side heat exchanger 12. In the relay unit 3, the first pump 21a and the second pump 21b are driven. In addition, the stop valve 24a and the stop valve 24b are opened, and the stop valve 24c and the stop valve 24d are closed. Accordingly, the heat medium circulates between the first intermediate heat exchanger 15a and the use-side heat exchanger 26a and between the second intermediate heat exchanger 15b and the use-side heat exchanger 26b. In addition, in the relay unit 3, the opening degree of the expansion valve 16e is set to a small value so that the refrigerant does not flow therethrough, and the expansion valve 16b and the expansion valve 16c are fully opened so that no pressure drop occurs. In this state, the operation of the compressor 10 is started.

First, the flow of the heat-source-side refrigerant in the refrigeration cycle will be described.

A low-temperature, low-pressure gas refrigerant is compressed by the compressor 10 and converted into a high-temperature, high-pressure refrigerant, and is discharged. The high-temperature, high-pressure refrigerant discharged from the compressor 10 passes through the four-way valve 11, the first connection pipe 4a, and the check valve 13b, and flows out of the heat source device 1. The high-temperature, high-pressure refrigerant that has flowed out of the heat source device 1 flows into the first relay unit 3a through the corresponding refrigerant pipe 4.

The high-temperature, high-pressure refrigerant that has flowed into the first relay unit 3a flows into the gas-liquid separator 14, and then flows into the first intermediate heat exchanger 15a. The high-temperature, high-pressure refrigerant that has flowed into the first intermediate heat exchanger 15a transfers heat to the heat medium which circulates through the heat medium circuit, and is converted into a high-pressure refrigerant. The high-pressure refrigerant that has flowed out of the first intermediate heat exchanger 15a is expanded and decompressed by the expansion valve 16d, and is converted into a low-temperature, low-pressure two-phase gas-liquid refrigerant. The two-phase gas-liquid refrigerant flows into a passage that extends through the expansion valve 16a and a passage that extends through the expansion valve 16b.

The two-phase gas-liquid refrigerant that has passed through the expansion valve 16a is further expanded and decompressed by the expansion valve 16a and is converted into a low-temperature, low-pressure two-phase gas-liquid refrigerant. The low-temperature, low-pressure two-phase gas-liquid refrigerant flows into the second intermediate heat exchanger 15b, which functions as an evaporator. The two-phase gas-liquid refrigerant that has flowed into the second intermediate heat exchanger 15b takes heat away from the heat medium, which circulates through the heat medium circuit, and is converted into a low-temperature, low-pressure gas refrigerant. The low-temperature, low-pressure gas refrigerant that has flowed out of the second intermediate heat exchanger 15b passes through the expansion valve 16c.

The two-phase gas-liquid refrigerant that has passed through the expansion valve 16b merges with the refrigerant that has passed through the second intermediate heat exchanger 15b and the expansion valve 16c to become a low-temperature, low-pressure refrigerant having a high quality. The low-temperature, low-pressure refrigerant flows out of the second relay unit 3b and the first relay unit 3a, and flows into the heat source device 1 through the corresponding refrigerant pipe 4.

The low-temperature, low-pressure refrigerant that has flowed into the heat source device 1 passes through the second connection pipe 4b and the check valve 13c, and flows into the heat-source-side heat exchanger 12, which functions as an evaporator. The low-temperature, low-pressure refrigerant that has flowed into the heat-source-side heat exchanger 12 takes heat away from the outdoor air, and is converted into a low-temperature, low-pressure gas refrigerant. The low-temperature, low-pressure gas refrigerant that has flowed out of the heat-source-side heat exchanger 12 is sucked into the compressor 10 again through the four-way valve 11 and the accumulator 17.

Next, the flow of the heat medium in the heat medium circuit will be described.

In the heating main operation mode, since the first pump 21a and the second pump 21b are both driven, the heat medium circulates through both the pipes 5a and the pipes 5b. The heat medium that has been heated by the heat-source-side refrigerant in the first intermediate heat exchanger 15a is caused to circulate through the pipes 5a by the first pump 21a. The heat medium that has been cooled by the heat-source-side refrigerant in the second intermediate heat exchanger 15b is caused to circulate through the pipes 5b by the second pump 21b.

The heat medium that has been pressurized by the first pump 21a and flowed out therefrom passes through the flow switching valve 22a and the stop valve 24a, and flows into the use-side heat exchanger 26a. Then, in the use-side heat exchanger 26a, the heat medium heats the indoor air, thereby heating the air-conditioned space, such as the inside of the room where the corresponding indoor unit 2 is installed.

The heat medium that has been pressurized by the second pump 21b and flowed out therefrom passes through the flow switching valve 22b and the stop valve 24b, and flows into the use-side heat exchanger 26b. Then, the heat medium takes heat away from the indoor air in the use-side heat exchanger 26b, thereby cooling the air-conditioned space, such as the inside of the room where the corresponding indoor unit 2 is installed.

After that, the heat medium that has contributed to heating flows out of the use-side heat exchanger 26a, and flows into the flow control valve 25a. At this time, the flow control valve 25a operates so as to adjust the flow rate of the heat medium so that only an amount of heat medium required to cover the air conditioning load needed in the air-conditioned space, such as the inside of the room, flows into the use-side heat exchanger 26a, and the remaining heat medium flows through the bypass 27a so as to bypass the use-side heat exchanger 26a. The heat medium that has passed through the bypass 27a merges with the heat medium that has passed through the use-side heat exchanger 26a without contributing to the heat exchange, passes through the flow switching valve 23a, and flows into the first intermediate heat exchanger 15a again.

Similarly, the heat medium that has contributed to cooling flows out of the use-side heat exchanger 26b, and flows into the flow control valve 25b. At this time, the flow control valve 25b operates so as to adjust the flow rate of the heat medium so that only an amount of heat medium required to cover the air conditioning load needed in the air-conditioned space, such as the inside of the room, flows into the use-side heat exchanger 26b, and the remaining heat medium flows through the bypass 27b so as to bypass the use-side heat exchanger 26b. The heat medium that has passed through the bypass 27b merges with the heat medium that has passed through the use-side heat exchanger 26b without contributing to the heat exchange, passes through the flow switching valve 23b, and flows into the second intermediate heat exchanger 15b again.

During this period, owing to the functions of the flow switching valves 22 (the flow switching valve 22a and the flow switching valve 22b) and the flow switching valves 23 (the flow switching valve 23a and the flow switching valve 23b), the hot heat medium (the heat medium used for the heating load) and the cold heat medium (the heat medium used for the cooling load) flow into the use-side heat exchanger 26a having the heating load and the use-side heat exchanger 26b having the cooling load, respectively, without being mixed.

The air conditioning loads needed in the air-conditioned space, such as the inside of the room, can be covered by controlling the operation with the controller 60 so that the differences between the temperatures obtained by the third temperature sensors 33 and the respective fourth temperature sensors 34 are maintained at respective target values.

When a heating load or a cooling load is generated by the use-side heat exchanger 26c or the use-side heat exchanger 26d, the stop valve 24c or the stop valve 24d may be opened to circulate the heat medium.

(Structure of Pumps 21)

Figure 8:
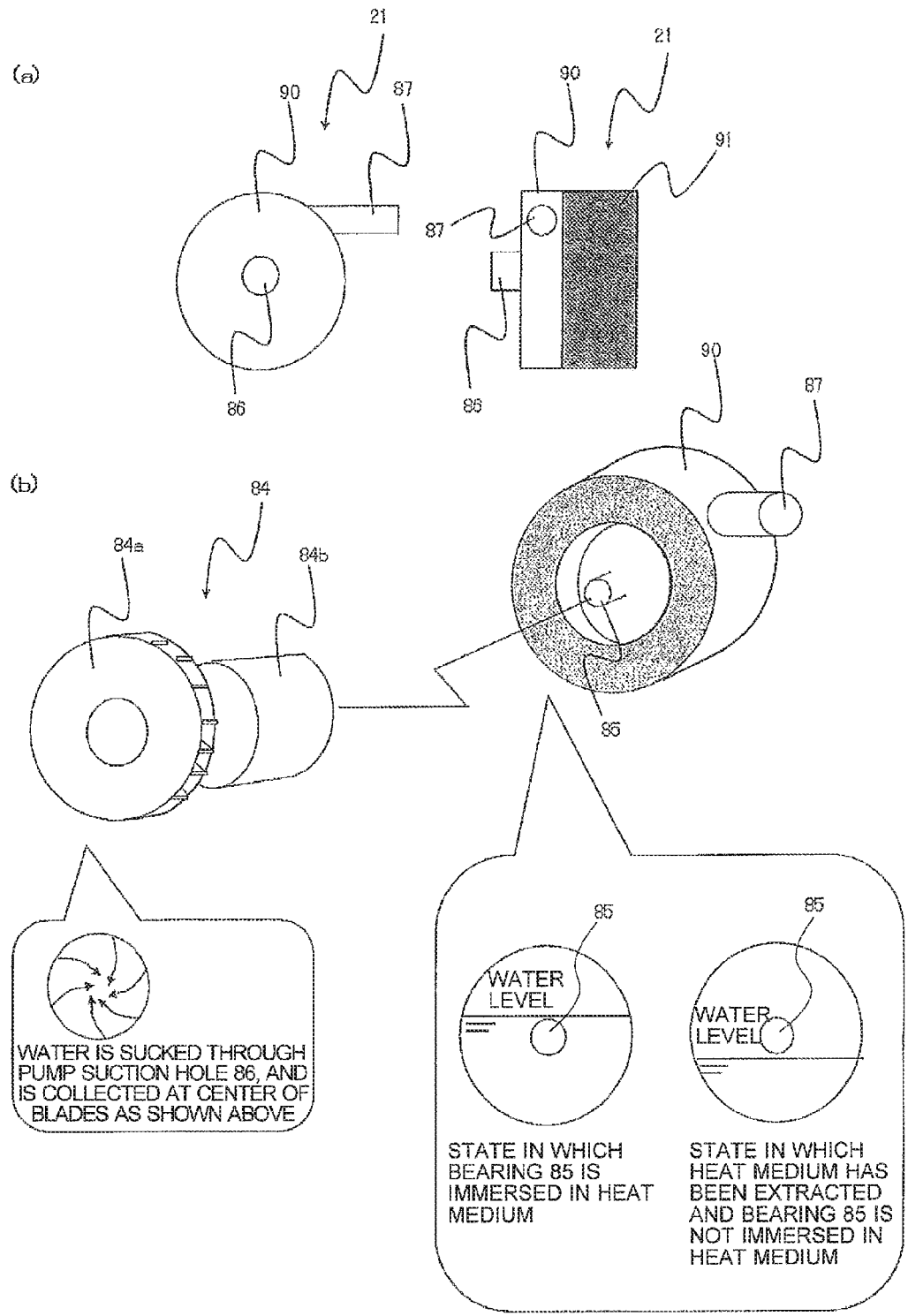
FIG. 8 is a schematic diagram illustrating the structure of a pump 21 included in the air-conditioning apparatus 100 according to Embodiment 1 of the present invention.

FIG. 8 is a schematic diagram illustrating the structure of each pump 21 included in the air-conditioning apparatus 100 according to Embodiment 1 of the present invention. FIG. 8(a) shows the external views of the pump 21, and FIG. 8(b) is an exploded perspective view of a heat-medium sucking/discharging portion 90 included in the pump 21. Although the pump 21 illustrated in FIG. 8 is a so-called centrifugal pump, the type of the pump 21 is not particularly limited.

As illustrated in FIG. 8(a), the pump 21 includes the heat-medium sucking/discharging portion 90 and a mechanical portion 91.

The heat-medium sucking/discharging portion 90 has a pump suction hole 86 through which the heat medium is sucked into the pump 21 and a pump discharge hole 87 through which the heat medium that has been pressurized in the pump 21 is discharged to the outside. As illustrated in FIG. 8(b), the heat-medium sucking/discharging portion 90 has a cylindrical shape, and has a bearing 85 formed therein. The bearing 85 is made of a resin and projects so as to extend from a cylindrical opening to the mechanical portion 91. A blade structure 84, which includes a blade portion 84a and a blade-rotation transmitting portion 84b, is provided to pressurize the heat medium that has been sucked in through the pump suction hole 86.

The blade-rotation transmitting portion 84b, which has a columnar shape, of the blade structure 84 is inserted into the opening of the main body of the above-described cylindrical heat-medium sucking/discharging portion 90 so that the blade-rotation transmitting portion 84b extends into the mechanical portion 91 and engages with the bearing 85. In this state, the blade-rotation transmitting portion 84b is accommodated in the main body of the heat-medium sucking/discharging portion 90, but the blade portion 84a is externally exposed. Therefore, the heat-medium sucking/discharging portion 90 is formed by covering the blade portion 84a from the outside.

The mechanical portion 91 rotates the blade-rotation transmitting portion 84b, which has been inserted through the cylindrical opening, around the bearing 85. The speed of the rotation is determined on the basis of an instruction value obtained from the controller 60. The mechanical portion 91 contains a drive circuit (not shown) that receives the instruction value from the controller 60 and rotates the blade-rotation transmitting portion 84b.

(Drawbacks Caused by Reduction in Amount of Heat Medium)

The pump 21, which is a centrifugal pump, generally cools the heat it generates by using the heat medium, such as water, circulated by the pump 21. When, for example, the safety valve 82, which is activated when the internal pressure of the heat medium circuit is increased, is activated or a hole is formed in the pipes 5, the amount of heat medium in the heat medium circuit decreases, and the amount of heat medium that circulates decreases accordingly. In this case, there is a risk that components made of a resin, such as the bearing 85, will be damaged due to lack of heat medium for cooling them. For example, referring to FIG. 8(b), it can be determined that the amount of heat medium for cooling the bearing 85 is sufficient if the bearing 85 is immersed in the heat medium while the pump 21 is not rotating, and that the amount of heat medium for cooling the bearing 85 is insufficient if the bearing 85 is not immersed in the heat medium while the pump 21 is not rotating. In addition, the load applied to the blade portion 84a when the pump 21 rotates significantly differs between the case in which the pump 21 discharges the heat medium and the case in which the pump 21 discharges air. Therefore, when the amount of heat medium in the heat medium circuit is small, the rotational speed varies much each time air bubbles pass through the pump 21.

Figure 9:
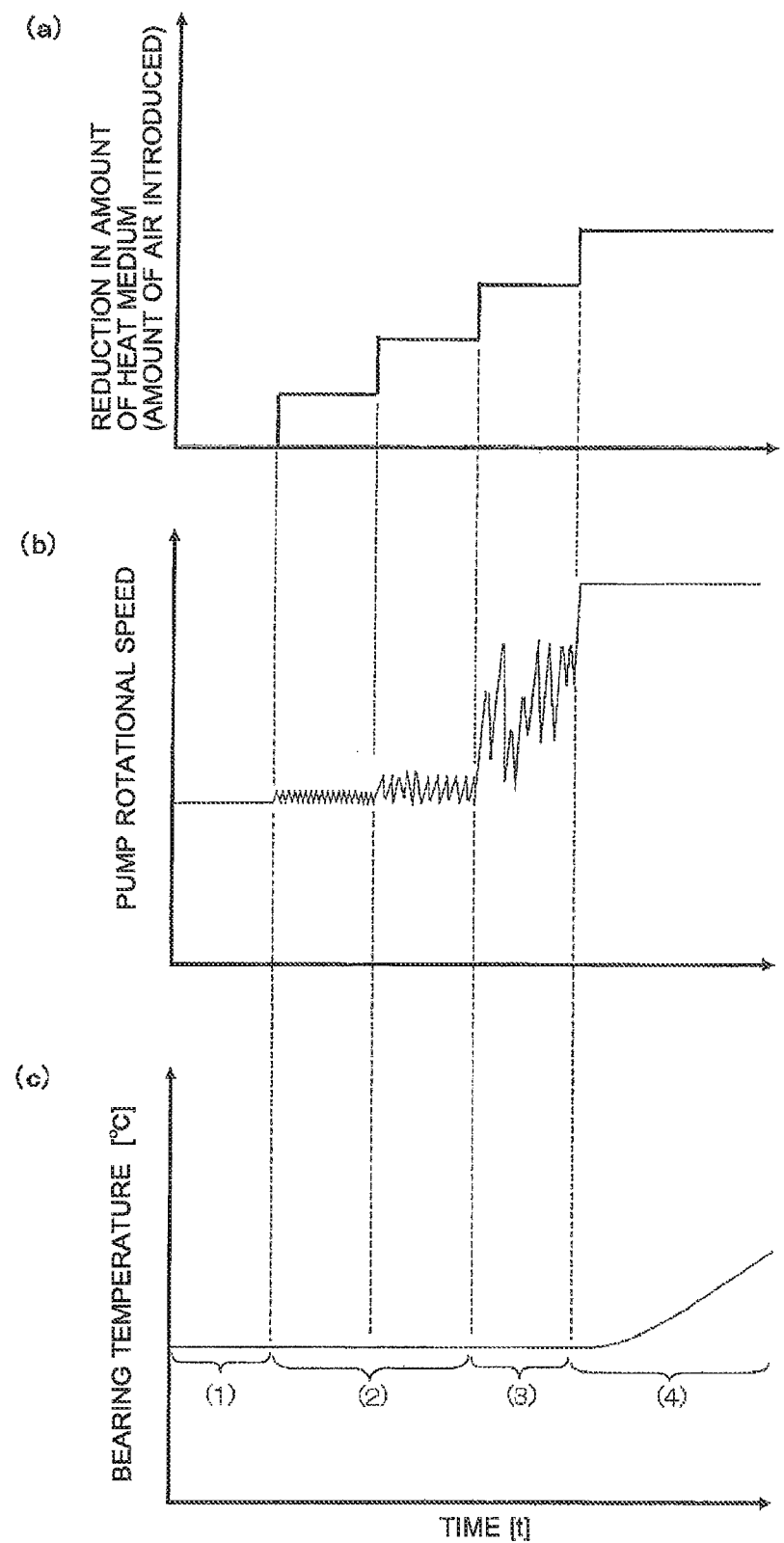
FIG. 9 shows graphs of reduction in the amount of heat medium, pump rotational speed, and bearing temperature of the pump 21 included in the air-conditioning apparatus 100 according to Embodiment 1 of the present invention.

FIG. 9 shows graphs of reduction in the amount of heat medium, pump rotational speed, and bearing temperature of the pump 21 included in the air-conditioning apparatus 100 according to Embodiment 1 of the present invention.

FIG. 9 shows the variations in the rotational speed of the pump 21 (pump rotational speed) and the temperature of the bearing 85 (bearing temperature) in the case where the heat medium is extracted from the heat medium circuit once every certain period of time. Referring to FIG. 9, range (1) along the time axis (horizontal axis) corresponds to the case in which the heat medium does not leak from the circuit. In this case, the pump rotational speed does not vary much as long as the instruction value transmitted from the controller 60 to the pump 21 and the heat medium passage are not changed. Range (2) corresponds to the case in which a small amount of heat medium is extracted. In this case, the bearing temperature does not change from that in range (1), but variation in the pump rotational speed increases from that in range (1). Range (3) corresponds to the case in which the heat medium is further extracted from the case of range (2) and air is introduced into the heat medium circuit. In this case, the bearing temperature does not change from that in range (2), but since the pump 21 more often sucks in the introduced air instead of the heat medium, the rotational speed thereof varies much each time air bubbles are sucked.

Range (4) corresponds to the case in which the heat medium is further extracted from the case of range (3) and there is very little heat medium in the heat medium circuit. The pump 21 sucks in and discharges the air that has been introduced into the heat medium circuit instead of the heat medium. Therefore, the rotational speed is constantly high, as in range (4). In range (4), since there is very little heat medium for cooling the pump 21 in the heat medium circuit, the bearing temperature increases, and finally reaches a temperature at which damage occurs. Normally, resin components, such as the bearing 85, will be damaged. However, depending on the manufacturing method and the structure of the pump 21, there is a risk that electrical components, such as the driving circuit contained in the heat-medium sucking/discharging portion 90, and the like will be damaged.

(Pump Protection Control)

As described above, when the heat medium is extracted from the heat medium circuit and the amount of heat medium for cooling the pump 21 becomes insufficient, the pump 21 will be damaged. Before this happens, insufficiency of the heat medium can be detected by detecting the pump rotational speed, because the pump rotational speed significantly varies in accordance with the reduction in the amount of heat medium. When the insufficiency of the heat medium is detected, damage to the pump 21 can be reduced by supplying additional heat medium to the heat medium circuit. A pump protection control process performed to reduce the damage to the pump 21 will now be described.

Figure 10:
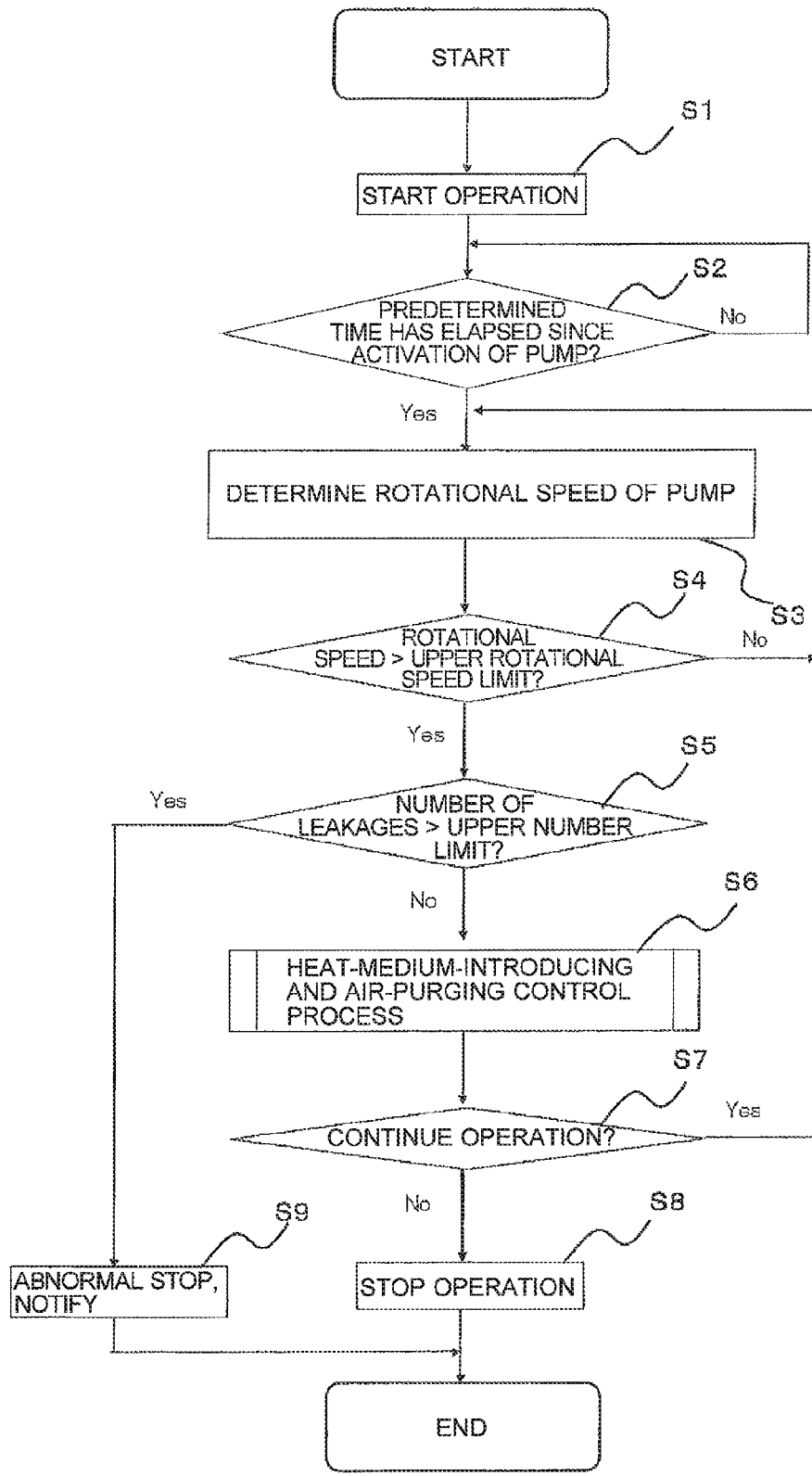
FIG. 10 is a flowchart of a pump protection control process performed by the air-conditioning apparatus 100 according to Embodiment 1 of the present invention.
Figure 11:
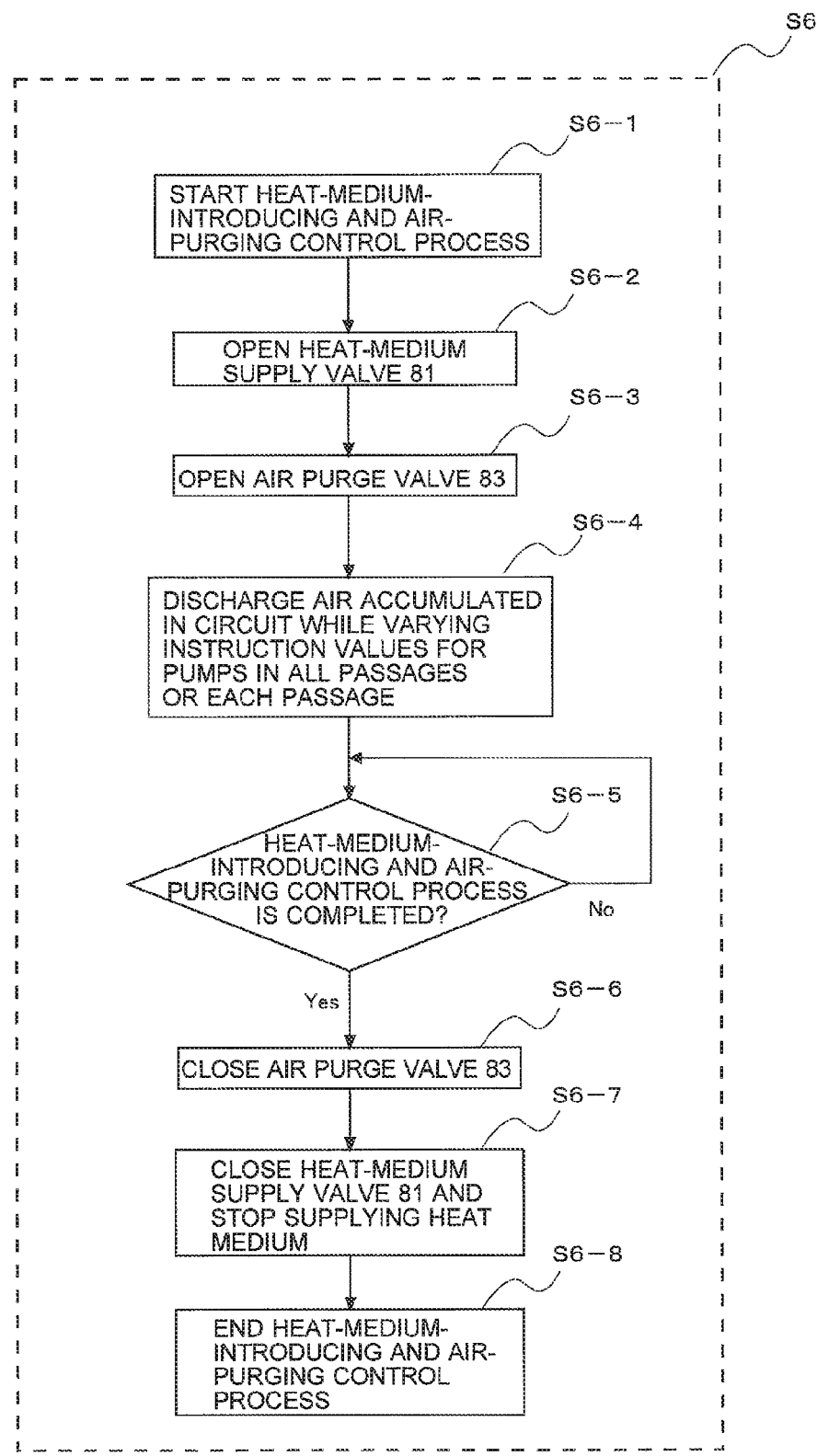
FIG. 11 is a flowchart of a heat-medium-introducing and air-purging control process included in the pump protection control process performed by the air-conditioning apparatus 100 according to Embodiment 1 of the present invention.

FIG. 10 is a flowchart of a pump protection control process performed by the air-conditioning apparatus 100 according to Embodiment 1 of the present invention. FIG. 11 is a flowchart of a heat-medium-introducing and air-purging control process included in the pump protection control process. The pump protection control process will now be described below with reference to FIGS. 10 and 11.

(S1)

The controller 60 starts the operation of the air-conditioning apparatus 100 in one of the above-described operation modes. At this time, the controller 60 resets the number of leakages, which will be described below. Then, the process proceeds to step S2.

The timing for resetting the above-described number of leakages is not limited to step S1, and the number of leakages may instead be reset at a timing having the same meaning as step S1.

(S2)

The controller 60 determines whether or not a predetermined time has elapsed since the activation of the pumps 21 (the first pump 21*a* and/or the second pump 21*b*). If it is determined that the predetermined time has elapsed, the process proceeds to step S3. If not, the controller 60 repeats the determination step.

(S3)

After the predetermined time since the activation of the pumps 21, the controller 60 detects a physical value for determining the rotational speed of each pump 21 (for example, a voltage applied to the pump 21 or a current that flows through the pump 21), and determines the rotational speed of the pump 21 on the basis of the physical value. Then, the process proceeds to step S4.

(S4)

The controller 60 determines whether or not the determined pump rotational speed is greater than a predetermined upper rotational speed limit. The upper rotational speed limit may be determined on the basis of, for example, an instruction value transmitted from the controller 60 to the pump 21. If it is determined that the pump rotational speed is greater than the upper rotational speed limit, the process proceeds to step S5. If not, the process returns to step S3.

(S5)

The controller 60 counts the number of times the pump rotational speed has exceeded the upper rotational speed limit (hereinafter referred to as the number of leakages), and determines whether or not the number of leakages is greater than a predetermined upper number limit. If it is determined that the number of leakages is greater than the upper number limit, the process proceeds to step S9. If not, the process proceeds to step S6.

(S6)

Since it has been determined that the pump rotational speed has exceeded the upper rotational speed limit, the controller 60 determines that the heat medium is leaking from the heat medium circuit, and performs a heat-medium-introducing and air-purging control process including steps S6-1 to S6-8 described below.

When it is determined that the heat medium is leaking from the heat medium circuit through which the heat medium is circulated by one of the two pumps 21, the other pump 21, which is operable, may be continuously driven while notification means (remote controller or the like that is not illustrated) notifies the user of the situation. Thus, the operation may be continued while notifying that an abnormality has occurred and maintenance or the like is needed. In this case, the user becomes aware of the abnormality and can take quick action to restore the normal state.

(S6-1)

The controller 60 starts the heat-medium-introducing and air-purging control process while continuing the current operation mode.

(S6-2)

The controller 60 opens the heat-medium supply valve 81 and prepares for automatic introduction of the heat medium into the heat medium circuit through the heat-medium supply valve 81. Then, the process proceeds to step S6-3.

(S6-3)

The controller 60 opens the air purge valve 83 and prepares to discharge the air that has entered the heat medium circuit. Then, the process proceeds to step S6-4.

(S6-4)

On the basis of the fact that an abnormal pump rotational speed has been detected during the operation in the current operation mode, the controller 60 assumes that air has been accumulated in the heat medium circuit through which the heat medium is circulated in the current operation mode, and performs a control process for discharging the accumulated air. For example, in the case where the operation is performed in the cooling main operation mode as illustrated in FIG. 6 or the heating main operation mode as illustrated in FIG. 7, the controller 60 automatically supplies the heat medium through the heat-medium supply valve 81 and discharges the air that has entered the heat medium circuit through the air purge valve 83 while driving the two pumps 21 so that the heat medium circulates through all of the indoor units (indoor units 2*a* and 2*b* in FIGS. 6 and 7) that are performing the air conditioning operation. At this time, the controller 60 drives the pumps 21 while varying the rotational speeds thereof, thereby effectively discharging the air that has entered the heat medium circuit. Next, the controller 60 automatically supplies the heat medium through the heat-medium supply valve 81 and discharges the air that has entered the heat medium circuit through the air purge valve 83 while causing the heat medium to circulate through the indoor units 2 that have been performing the air conditioning operation individually. This can be achieved by controlling the flow switching valves 22, the flow switching valves 23, the stop valves 24, and the flow control valves 25 with the controller 60. Since the amount of heat medium that flows through the heat medium circuit for each indoor unit 2 can be increased, the air that has entered the heat medium circuit can be more effectively discharged. Also at this time, the controller 60 drives the pumps 21 while varying the rotational speeds thereof. Then, the process proceeds to step S6-5.

To automatically introduce of the heat medium into the heat medium circuit as described above, a heat-medium introducing apparatus (not shown), for example, may be connected to the heat-medium supply valve 81. The heat-medium introducing apparatus may be installed in, for example, a space in which the relay unit 3 is installed. In this case, the heat-medium introducing apparatus may be communicably coupled to the controller 60, and when the heat-medium-introducing and air-purging control process is to be executed, the controller 60 may transmit a control signal for causing the heat-medium introducing apparatus to start introducing the heat medium.

The above-described method of introducing the heat medium and discharging the air through circulation passages of the heat medium circuit is merely an example, and the control process is not limited to this. The introduction of the heat medium and the discharge of the air may be performed while causing the heat medium to circulate through the heat medium circuit by another method.

In the cooling only operation mode illustrated in FIG. 4 or the heating only operation mode illustrated in FIG. 5, only one of the two pumps 21 is driven and the heat medium circulates through only one of the cooling circuit and the heating circuit. Therefore, for example, the heat medium cannot be automatically introduced through the heat-medium supply valve 81 in the cooling only operation mode, and the air cannot be discharged through the air purge valve 83 in the heating only operation mode. To avoid such a situation, a valve similar to the heat-medium supply valve 81 may be connected to a pipe 5 that branches from the pipe on the upstream side of the second pump 21b, and a valve similar to the air purge valve 83 may be connected to a pipe 5 that branches from the pipe on the downstream side of the first pump 21a. In this case, the heat medium can be automatically introduced and the air that has entered the heat medium circuit can be discharged also in the cooling only operation mode and the heating only operation mode. As a result, the heat medium can be automatically introduced and the air that has entered the heat medium circuit can be discharged in all of the operation modes (the cooling only operation mode, the heating only operation mode, the cooling main operation mode, and the heating main operation mode).

Although the heat-medium-introducing and air-purging control process is performed while continuing the operation in the current operation mode in the above-described example, the control process is not limited to this. More specifically, in the heat medium circuit, since leakage of the heat medium is a state of abnormal and the occurrence of such an abnormal state is low, the heat-medium-introducing and air-purging control process may be performed after stopping the operation in the current operation mode, that is, after setting the refrigeration cycle to a thermo-off state. In this case, the control process is not limited by the passages through which the heat medium circulates in each operation mode. Therefore, for example, the flow switching valves 22, the flow switching valves 23, the stop valves 24, and the flow control valves 25 may be fully opened and the two pumps 21 may be driven so that the heat medium can be automatically introduced into the entire heat medium circuit, and the air can be discharged from the entire heat medium circuit. Moreover, the operation of circulating the heat medium through the indoor units 2 individually, of course, can also be performed. Then, after the introduction of the heat medium into the heat medium circuit and the discharge of the air are completed, the refrigeration cycle is set to a thermo-on state again and the operation in the operation mode that has been suspended can be restarted.

(S6-5)

The controller 60 determines whether or not the heat-medium-introducing and air-purging control process has been completed. The determination may be performed on the basis of, for example, whether or not a predetermined time has elapsed since the start of the heat-medium-introducing and air-purging control process in step S6-4 or whether or not the state in which the rotational speeds of the pumps 21 that are driven are lower than or equal to the upper rotational speed limit has continued for a predetermined time. If it is determined that the heat-medium-introducing and air-purging control process is completed, the process proceeds to step S6-6.

(S6-6)

The controller 60 closes the air purge valve 83 and stops the operation of discharging the air from the heat medium circuit. Then, the process proceeds to step S6-7.

(S6-7)

The controller 60 closes the heat-medium supply valve 81 and stops the operation of automatically introducing the heat medium into the heat medium circuit. Then, the process proceeds to step S6-8.

(S6-8)

The controller 60 stops the heat-medium-introducing and air-purging control process. Then, the process proceeds to step S7.

(S7)

The controller 60 determines whether or not to continue the operation of the air-conditioning apparatus 100. The determination of whether or not to continue the operation is performed such that, for example, when an operation stop signal is received from operation means (not shown), it is determined that the operation is to be stopped. When the operation of the air-conditioning apparatus 100 is continued, the process returns to step S3. When the operation is to be stopped, the process proceeds to step S8.

(S8)

The controller 60 stops the operation of the air-conditioning apparatus 100.

(S9)

When it is determined that the number of leakages is greater than the upper number limit, the controller 60 determines that there is a serious defect, for example, there is a hole in one of the pipes 5 of the heat medium circuit. In this case, the controller 60 stops the operation of the air-conditioning apparatus 100 (stops the compressor 10 and the pumps 21) and causes the notification means (not shown) to notify the user of the abnormality.

Effect of Embodiment 1

With the above-described structure and operation, even when the heat medium leaks from the heat medium circuit for some reason and air enters the heat medium circuit, the leakage of the heat medium can be detected by determining the pump rotational speed. By detecting the leakage of the heat medium, the operation of introducing the heat medium into the heat medium circuit can be performed and damage to the pumps (in particular, the bearing 85, the driving circuit, etc.), which occurs when cooling with the heat medium cannot be performed due to insufficiency of the heat medium, can be reduced and the reliability can be increased.

Since the normal air conditioning operation can be performed while the operation of introducing the heat medium into the heat medium circuit is performed as described above, the reliability can be further increased and a user-friendly air-conditioning apparatus can be provided.

The invention claimed is:

1. An air-conditioning apparatus comprising:
   a heat source device including a compressor that compresses a heat-source-side refrigerant and a heat-source-side heat exchanger that exchanges heat between outside air and the heat-source-side refrigerant;
   a relay unit including an intermediate heat exchanger that exchanges heat between the heat-source-side refrigerant and a heat medium, an expansion device that reduces a pressure of the heat-source-side refrigerant, and a pump that pressure-feeds the heat medium;
   an indoor unit including a use-side heat exchanger that exchanges heat between air in an air-conditioned space and the heat medium; and
   a controller that controls at least the heat source device and the relay unit, wherein
   a refrigeration cycle through which the heat-source-side refrigerant circulates is formed by connecting the compressor, the heat-source-side heat exchanger, a heat-source-side refrigerant passage of the intermediate heat exchanger, and the expansion device with a refrigerant pipe,
   a heat medium circuit through which the heat medium circulates is formed by connecting a heat medium passage of the intermediate heat exchanger, the pump, and the use-side heat exchanger with a pipe, and
   while driving the pump, the controller detects a rotational speed of the pump and, on a basis of the rotational speed, starts a heat-medium introducing operation in which the heat medium is introduced into the heat medium circuit, and an air purging operation in which air that has entered the heat medium circuit is discharged,
   wherein the controller counts a number of leakages, which is a number of times the detected rotational speed of the pump has exceeded an upper rotational speed limit, starts the air purging operation when the number of leakages is smaller than or equal to a predetermined upper number limit, and stops the air purging operation when a predetermined time has elapsed since the start of the air purging operation or the state in which the detected rotational speed of the pump are lower than or equal to the upper rotational speed limit has continued for a predetermined time.

2. The air-conditioning apparatus of claim 1, further comprising:
   a heat-medium supply valve provided to the pipe to introduce the heat medium into the heat medium circuit; and
   an air purge valve provided to the pipe to discharge the air that has entered the heat medium circuit, wherein
   in the heat-medium introducing operation and the air purging operation performed by the controller, the heat medium is automatically introduced into the heat medium circuit through the heat-medium supply valve and the air that has entered the heat medium circuit is discharged to outside through the air purge valve.

3. The air-conditioning apparatus of claim 1, wherein the controller counts a number of leakages, which is a number of times the detected rotational speed of the pump has exceeded an upper rotational speed limit, and starts the heat-medium introducing operation and the air purging operation when the number of leakages is smaller than or equal to a predetermined upper number limit.

4. The air-conditioning apparatus of claim 3, wherein the controller stops driving the compressor and the pump when the number of leakages exceeds the upper number limit.

5. The air-conditioning apparatus of claim 4, further comprising:
   notification means,
   wherein the controller causes the notification means to notify that the compressor and the pump are stopped because the number of leakages has exceeded the upper number limit.

6. The air-conditioning apparatus of claim 3, wherein the upper rotational speed limit is determined on a basis of an instruction value transmitted from the controller to the pump.

7. The air-conditioning apparatus of claim 1, further comprising:
   flow switching means including a valve that switches a passage of the heat medium that is pressure-fed by the pump and circulates through the heat medium circuit, wherein
   the controller performs the heat-medium introducing operation and the air purging operation while switching the passage of the heat medium that circulates through the heat medium circuit with the flow switching means.

8. The air-conditioning apparatus of claim 1, wherein the controller continuously drives the compressor in the refrigeration cycle to continue an air conditioning operation in a current operation mode during the heat-medium introducing operation and the air purging operation.

9. The air-conditioning apparatus of claim 1, wherein the controller sets the refrigeration cycle to a thermo-off state during the heat-medium introducing operation and the air purging operation.

10. The air-conditioning apparatus of claim 1, wherein, during the heat-medium introducing operation and the air purging operation, the controller drives the pump with varying the rotational speed thereof.

11. The air-conditioning apparatus of claim 1, wherein the controller detects the rotational speed of the pump after a predetermined time has elapsed since an activation of the pump.

12. The air-conditioning apparatus of claim 2, wherein the controller opens the air purge valve when the air purging operation starts, and closes the air purge valve when the air purging operation stops.

13. The air-conditioning apparatus of claim 1, further comprising:
   a heat-medium supply valve provided to the pipe to introduce the heat medium from outside of the heat medium circuit into inside of the heat medium circuit; and
   an air purge valve provided to the pipe to discharge the air that has entered the heat medium circuit, wherein
   in the heat-medium introducing operation and the air purging operation performed by the controller, the heat medium is automatically introduced into the heat medium circuit through the heat-medium supply valve and the air that has entered the heat medium circuit is discharged to outside through the air purge valve.

14. The air-conditioning apparatus of claim 2, wherein the operation of the air purge valve is controlled by the controller.

* * * * *